(12) United States Patent
Kim et al.

(10) Patent No.: US 10,564,337 B2
(45) Date of Patent: Feb. 18, 2020

(54) OPTICAL FILM

(71) Applicant: LG Chem, Ltd., Seoul (KR)

(72) Inventors: Sin Young Kim, Daejeon (KR); Sergey Belyaev, Daejeon (KR); Ji Youn Lee, Daejeon (KR); Moon Soo Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/764,116

(22) PCT Filed: Oct. 5, 2016

(86) PCT No.: PCT/KR2016/011139
§ 371 (c)(1),
(2) Date: Mar. 28, 2018

(87) PCT Pub. No.: WO2017/061768
PCT Pub. Date: Apr. 13, 2017

(65) Prior Publication Data
US 2018/0321431 A1    Nov. 8, 2018

(30) Foreign Application Priority Data

Oct. 5, 2015   (KR) .................. 10-2015-0139698
Oct. 5, 2015   (KR) .................. 10-2015-0139699

(51) Int. Cl.
*G02B 5/30*      (2006.01)
*G02F 1/1335*    (2006.01)
*G02C 7/12*      (2006.01)

(52) U.S. Cl.
CPC ............. *G02B 5/3033* (2013.01); *G02B 5/30* (2013.01); *G02F 1/133528* (2013.01);
(Continued)

(58) Field of Classification Search
None
See application file for complete search history.

(56) References Cited

U.S. PATENT DOCUMENTS 5,619,352 A * 4/1997 Koch .................. G02B 5/3016
349/117
2001/0022998 A1   9/2001 Verrall et al.
(Continued)

FOREIGN PATENT DOCUMENTS

CN     101573656 B    4/2011
JP     2001500984 A   1/2001
(Continued)

OTHER PUBLICATIONS

Search report from International Application No. PCT/KR2016/011139, dated Nov. 30, 2016.
(Continued)

*Primary Examiner* — Phu Vu
(74) *Attorney, Agent, or Firm* — Lerner, David, Littenberg, Krumholz & Mentlik, LLP

(57) ABSTRACT

The present application relates to an optical film and a use of the optical film, and can provide an optical film exhibiting selective transmission and blocking characteristics according to viewing angles, and such an optical film can be usefully used as a security film for a display device such as LCD, a smart window, sunglasses and the like.

14 Claims, 18 Drawing Sheets

(52) U.S. Cl.
CPC ....... *B32B 2305/55* (2013.01); *B32B 2307/42* (2013.01); *G02C 7/12* (2013.01)

(56) References Cited

U.S. PATENT DOCUMENTS

| | | | |
|---|---|---|---|
| 2004/0085487 A1 | 5/2004 | Chen et al. | |
| 2005/0129918 A1 | 6/2005 | MacMaster | |
| 2005/0219447 A1 | 10/2005 | Slaney et al. | |
| 2009/0128746 A1 | 5/2009 | Kean et al. | |
| 2012/0013831 A1* | 1/2012 | Parri | G02B 5/3016 349/117 |
| 2012/0212692 A1 | 8/2012 | Ryu et al. | |
| 2012/0327335 A1 | 12/2012 | Jeon et al. | |
| 2017/0192145 A1* | 7/2017 | Furuki | B32B 7/02 |
| 2018/0259812 A1* | 9/2018 | Goda | G02F 1/133634 |
| 2018/0321431 A1* | 11/2018 | Kim | G02F 1/1335 |

FOREIGN PATENT DOCUMENTS

| | | |
|---|---|---|
| JP | 2001117088 A | 4/2001 |
| JP | 2002055341 A | 2/2002 |
| JP | 2005513241 A | 5/2005 |
| JP | 2005173571 A | 6/2005 |
| JP | 2006505014 A | 2/2006 |
| JP | 2006337675 A | 12/2006 |
| JP | 2007156086 A | 6/2007 |
| JP | 2007298844 A | 11/2007 |
| JP | 2007322498 A | 12/2007 |
| JP | 2008542793 A | 11/2008 |
| JP | 2009104008 A | 5/2009 |
| JP | 2012521571 A | 9/2012 |
| JP | 2013521531 A | 6/2013 |
| KR | 20050000958 A | 1/2005 |
| KR | 20070090662 A | 9/2007 |
| KR | 20110132616 A | 12/2011 |
| KR | 20120008425 A | 1/2012 |
| KR | 20120099183 A | 9/2012 |

OTHER PUBLICATIONS

Chinese Search Report for Application No. CN 201680055801.5 dated Oct. 21, 2019, 1 page.

\* cited by examiner

[Figure 1]

| 103 |
|---|
| 102 |
| 101 |

[Figure 2]
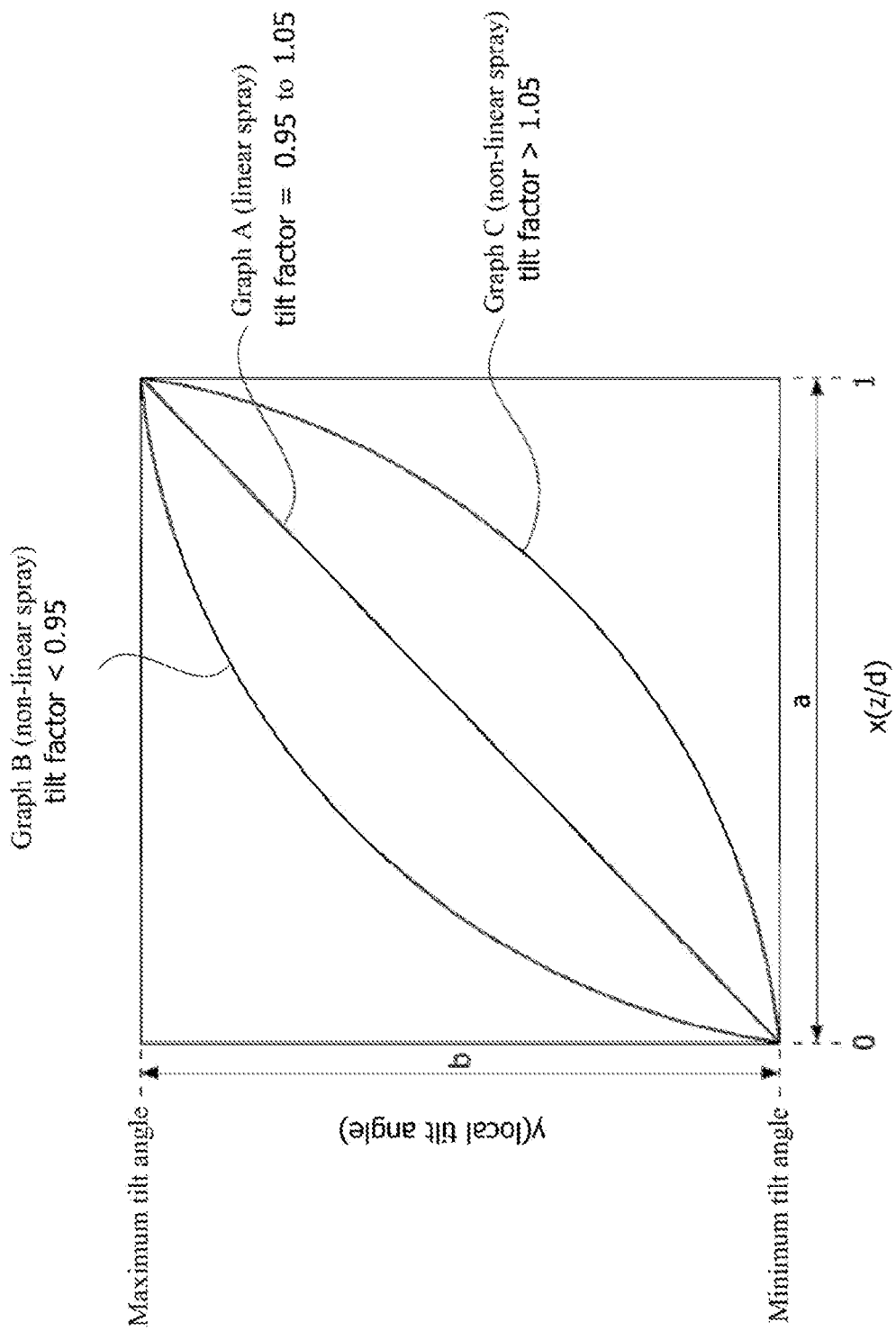

[Figure 3]
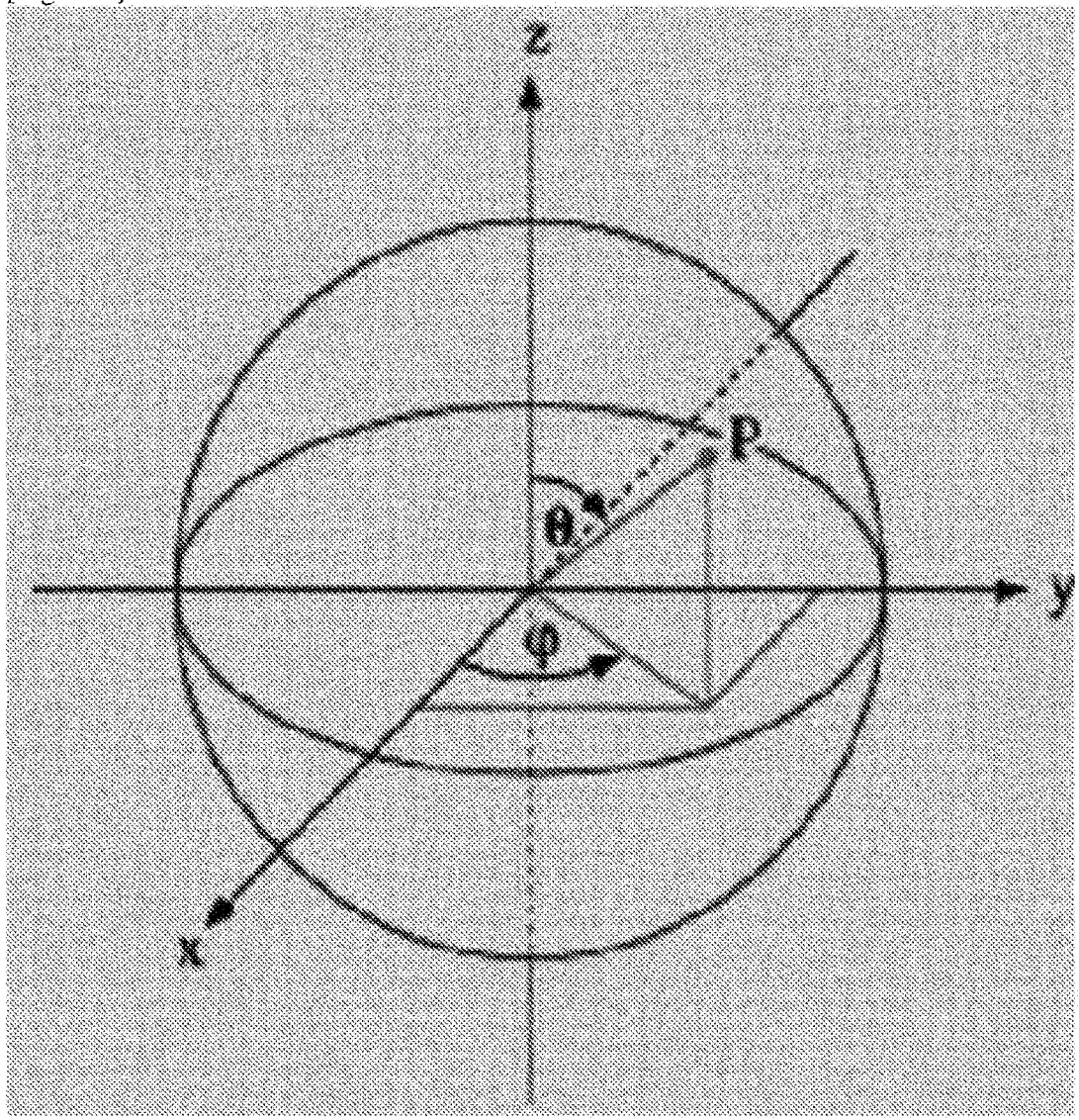

[Figure 4]
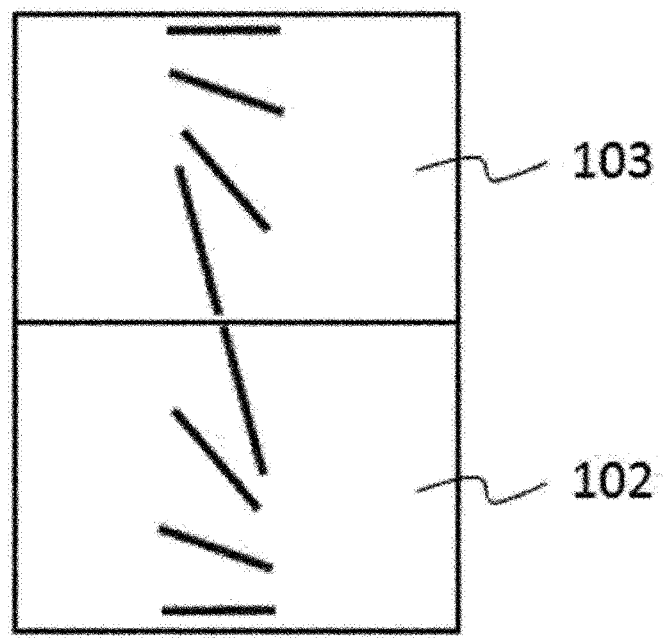
[Figure 5]
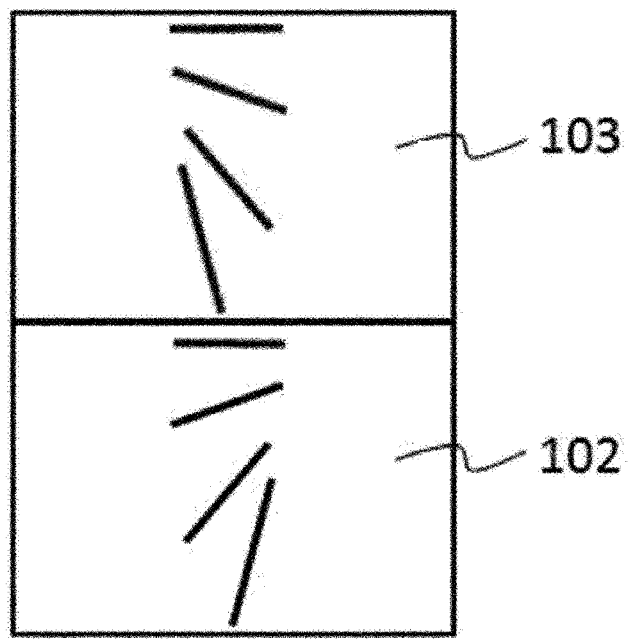

[Figure 6]
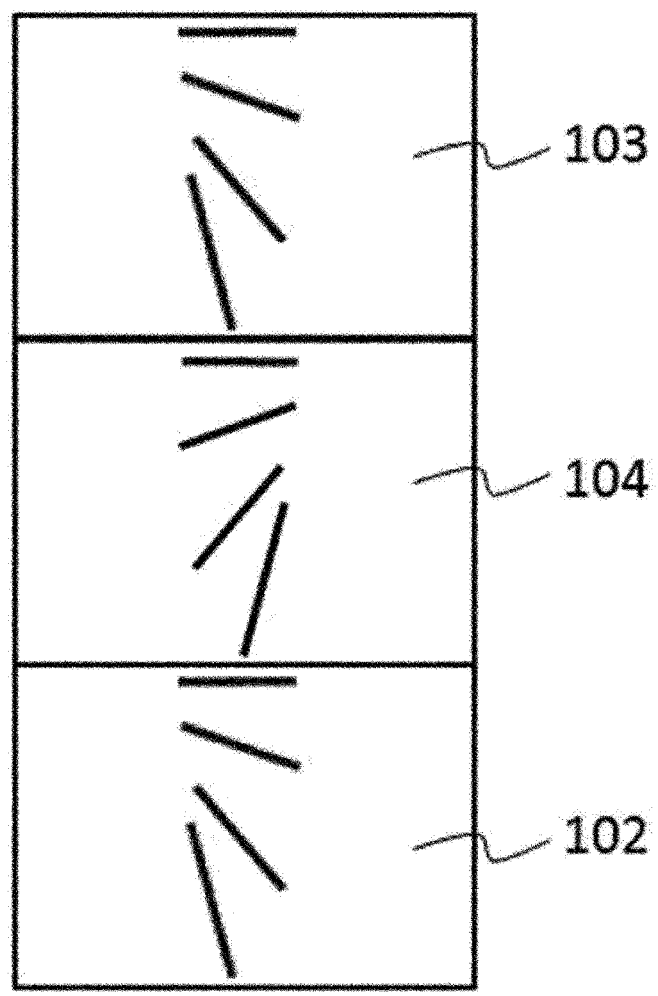

[Figure 7]
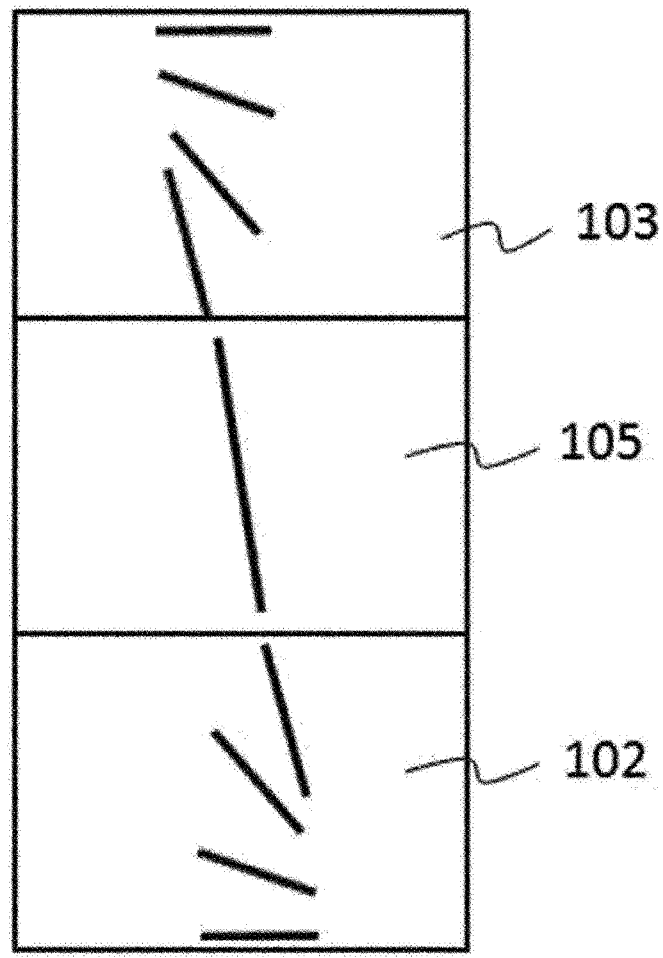
[Figure 8]
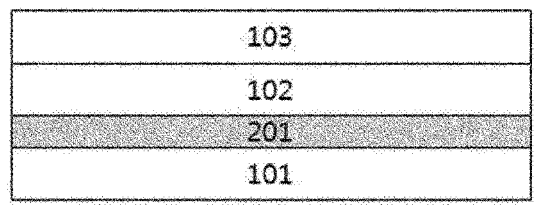
[Figure 9]
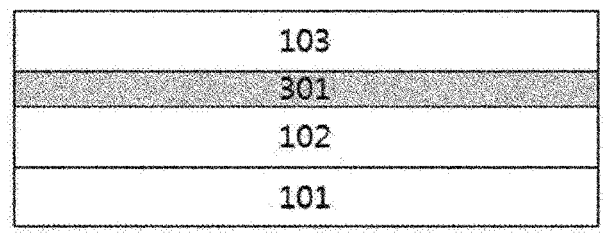

[Figure 10]

| 401B |
|---|
| 103 |
| 102 |
| 401A |
| 101 |

[Figure 11]

| 401B |
|---|
| 501B |
| 103 |
| 102 |
| 501A |
| 401A |
| 101 |

[Figure 12]

| 601 |
|---|
| 103 |
| 102 |
| 101 |

[Figure 13]

| 701 |
|---|
| 103 |
| 102 |
| 101 |

[Figure 14]
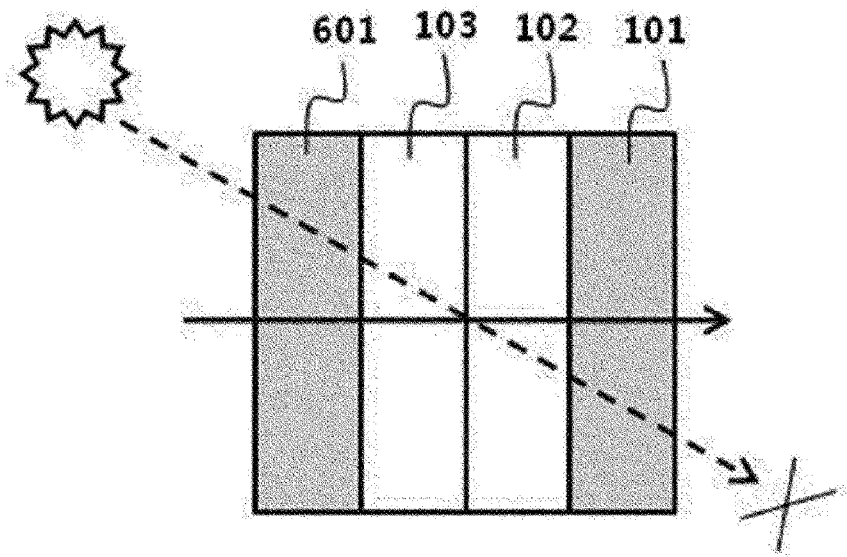
[Figure 15]
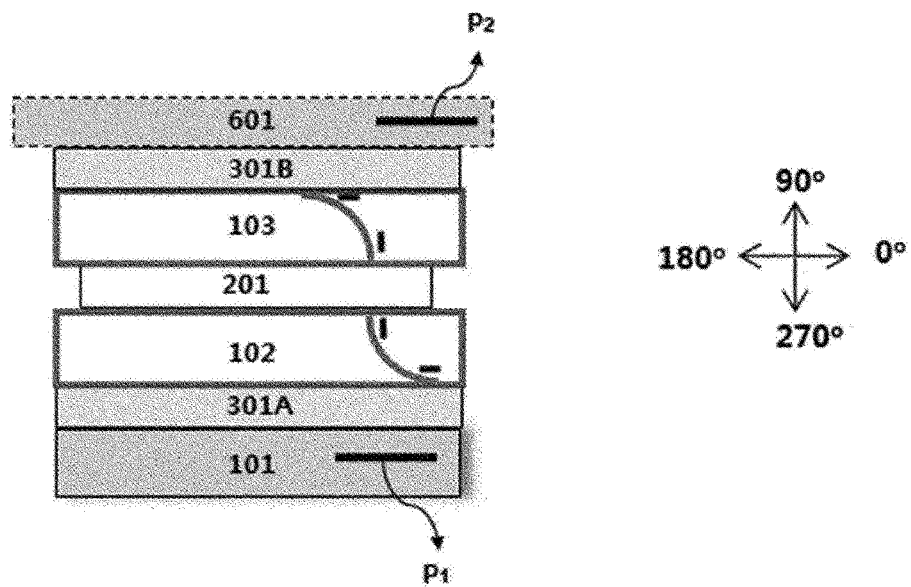

[Figure 16]
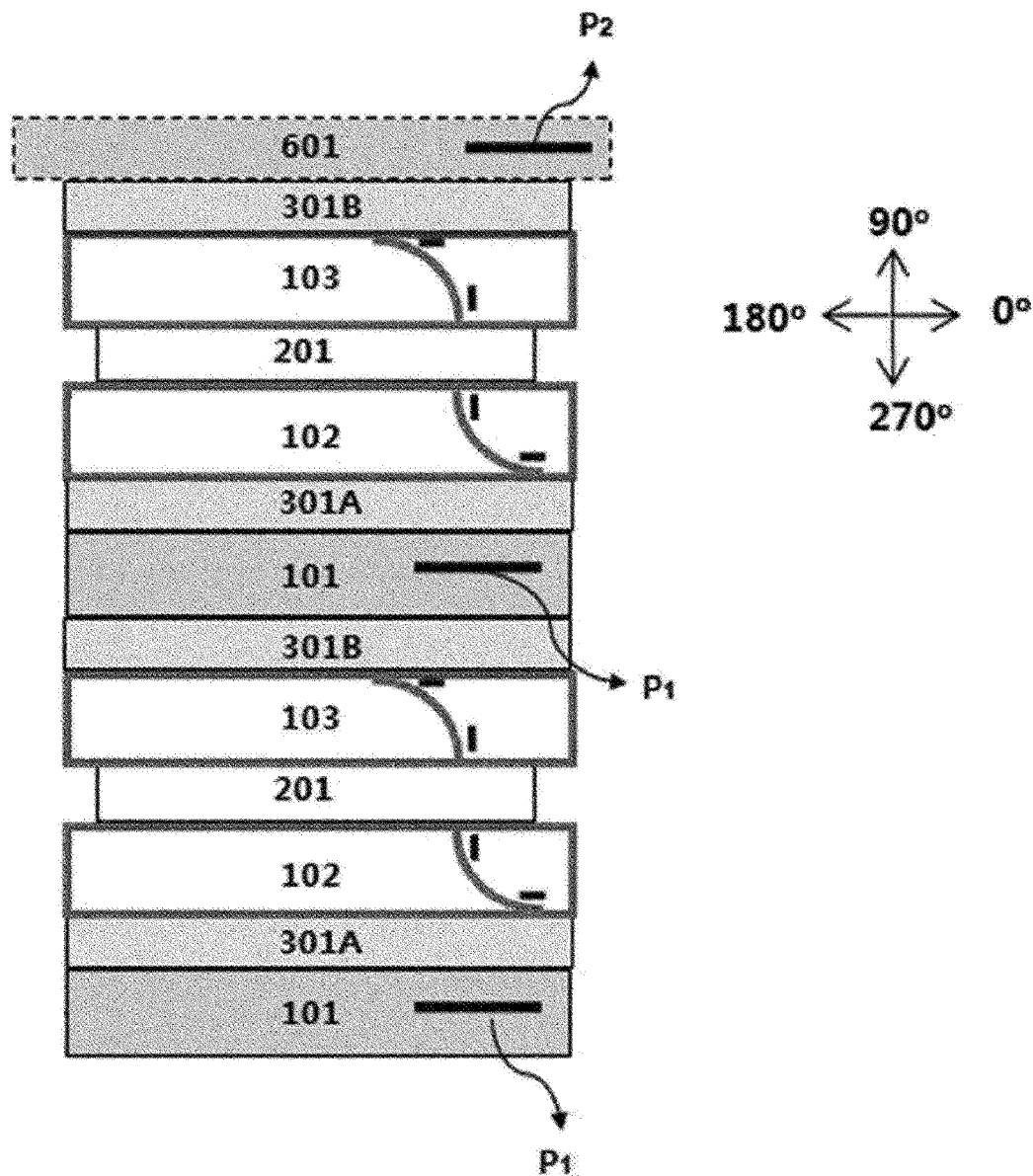

[Figure 17]
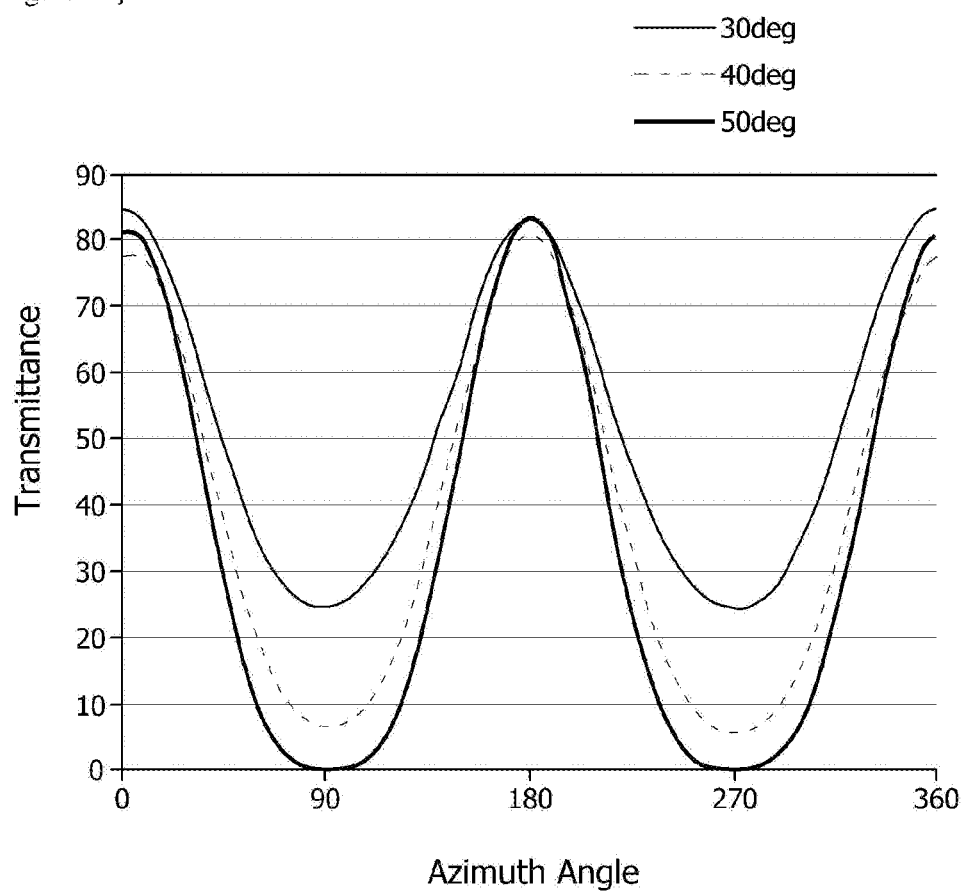

[Figure 18]
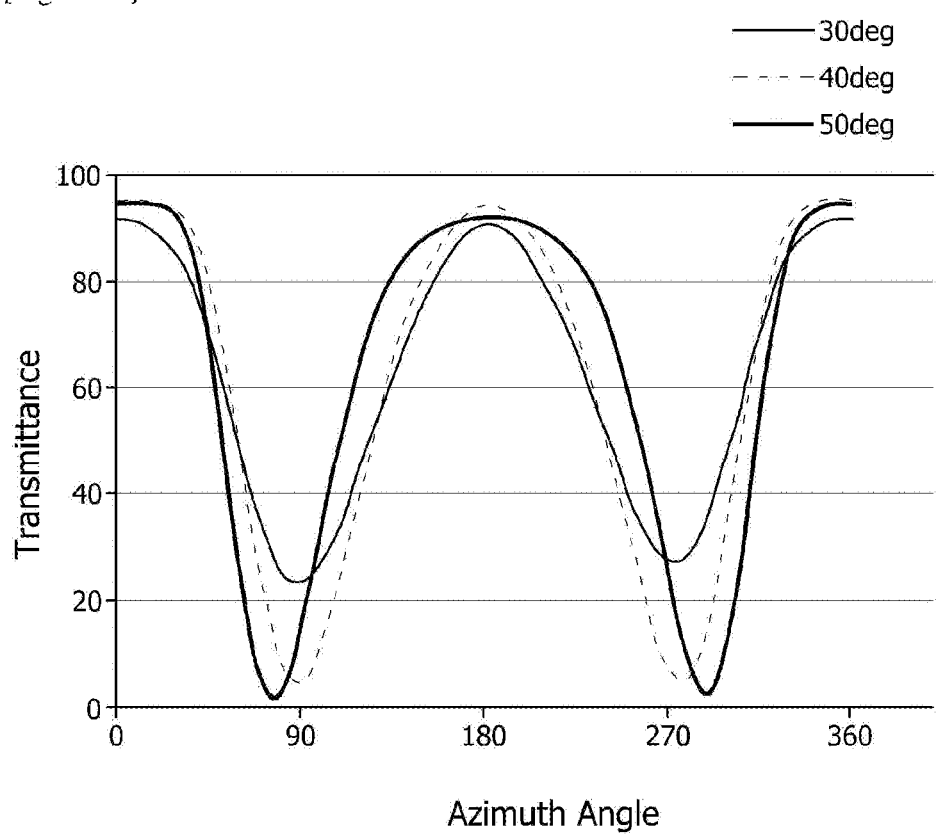

[Figure 19]
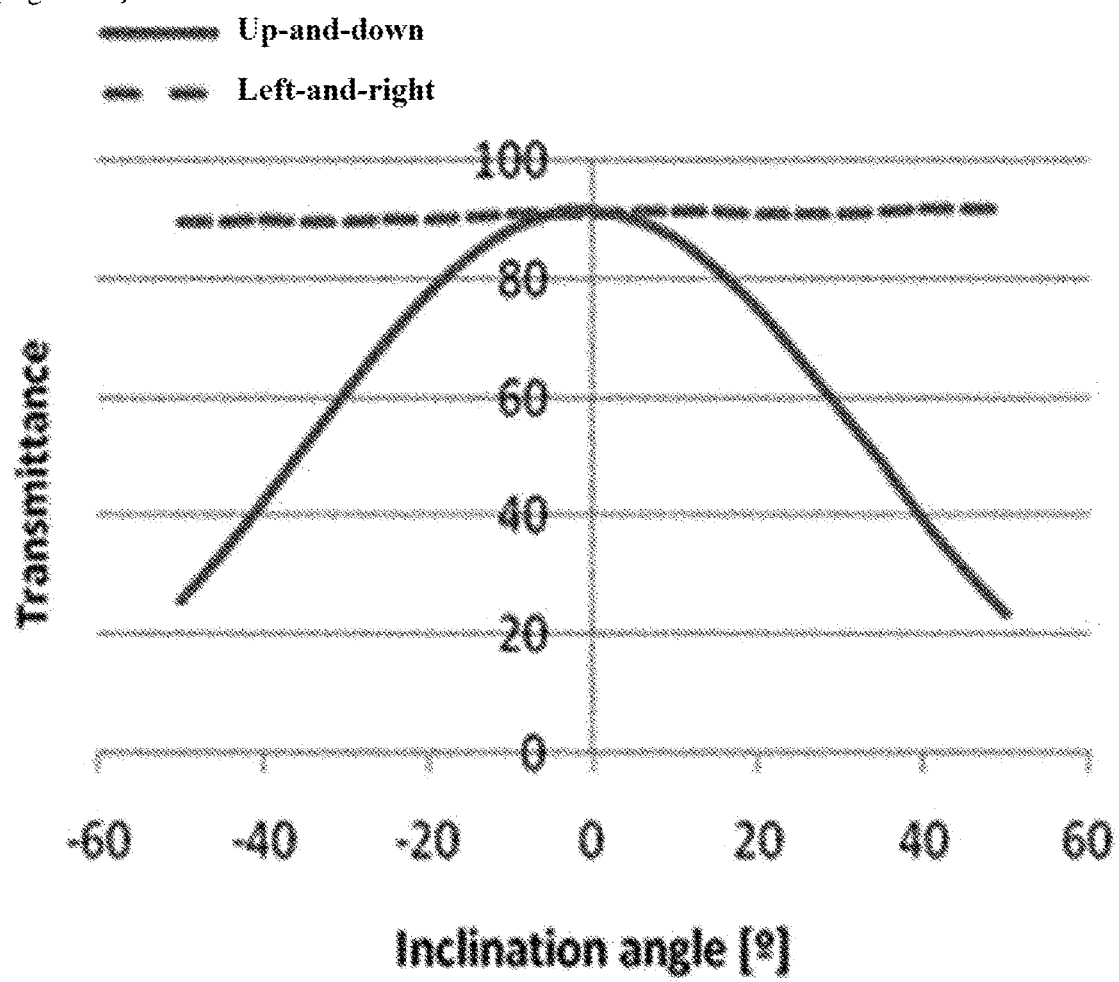

[Figure 20]
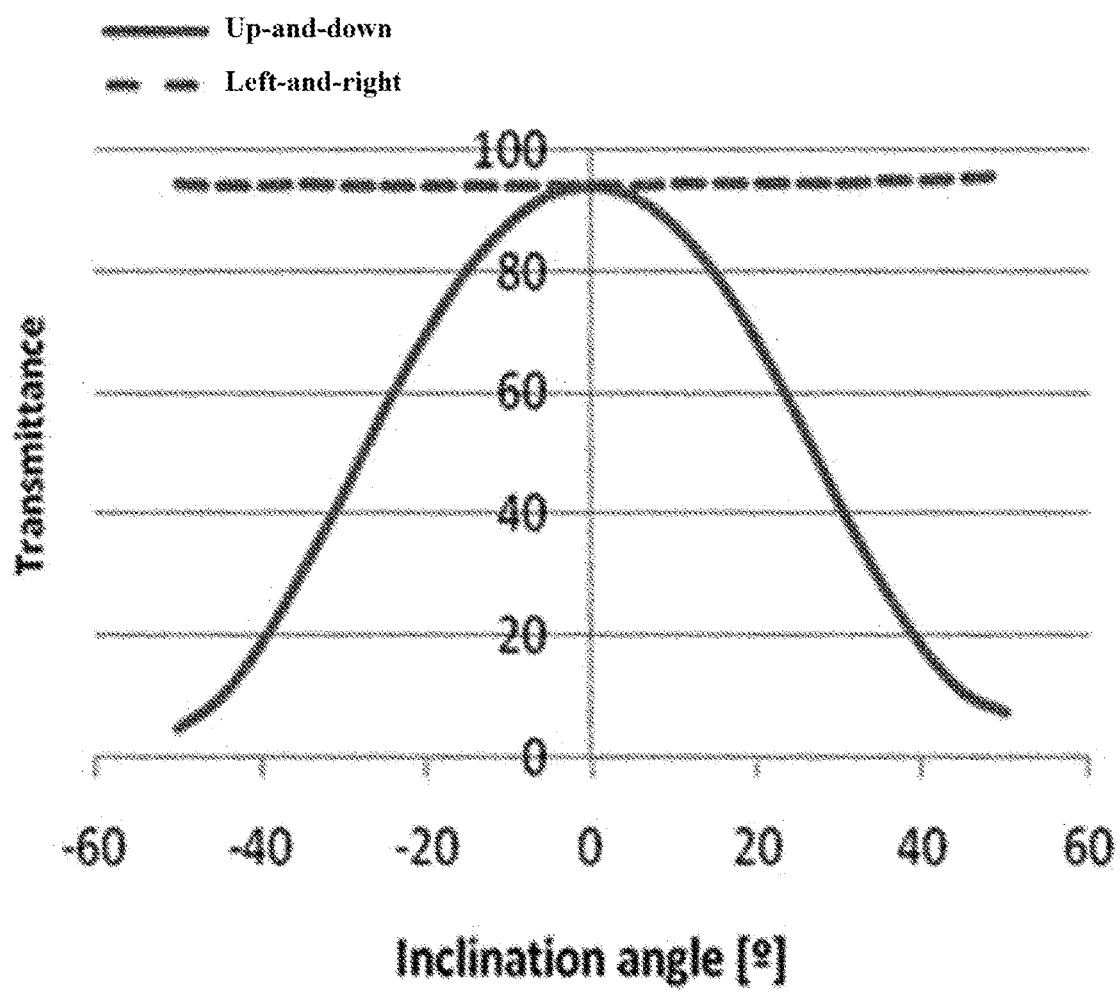

[Figure 21]
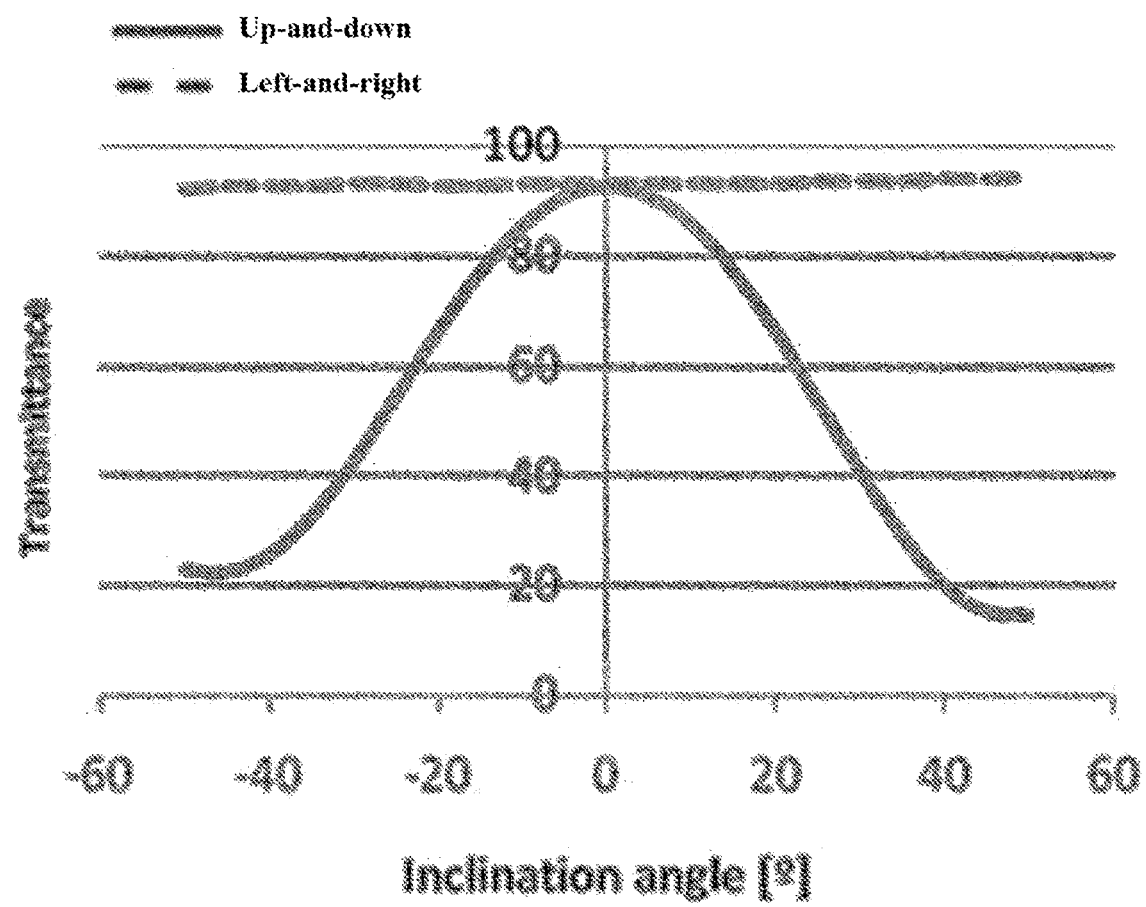

[Figure 22]
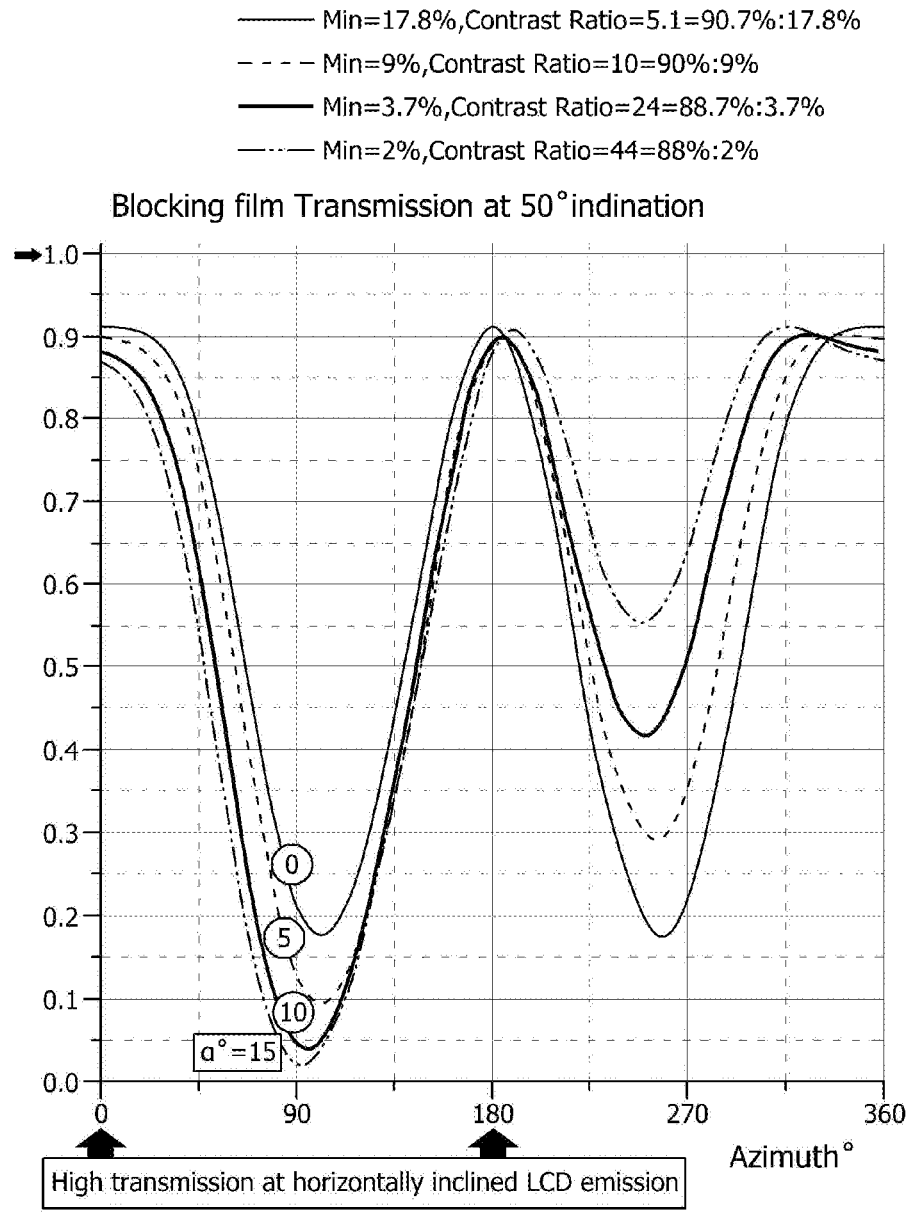

[Figure 23]
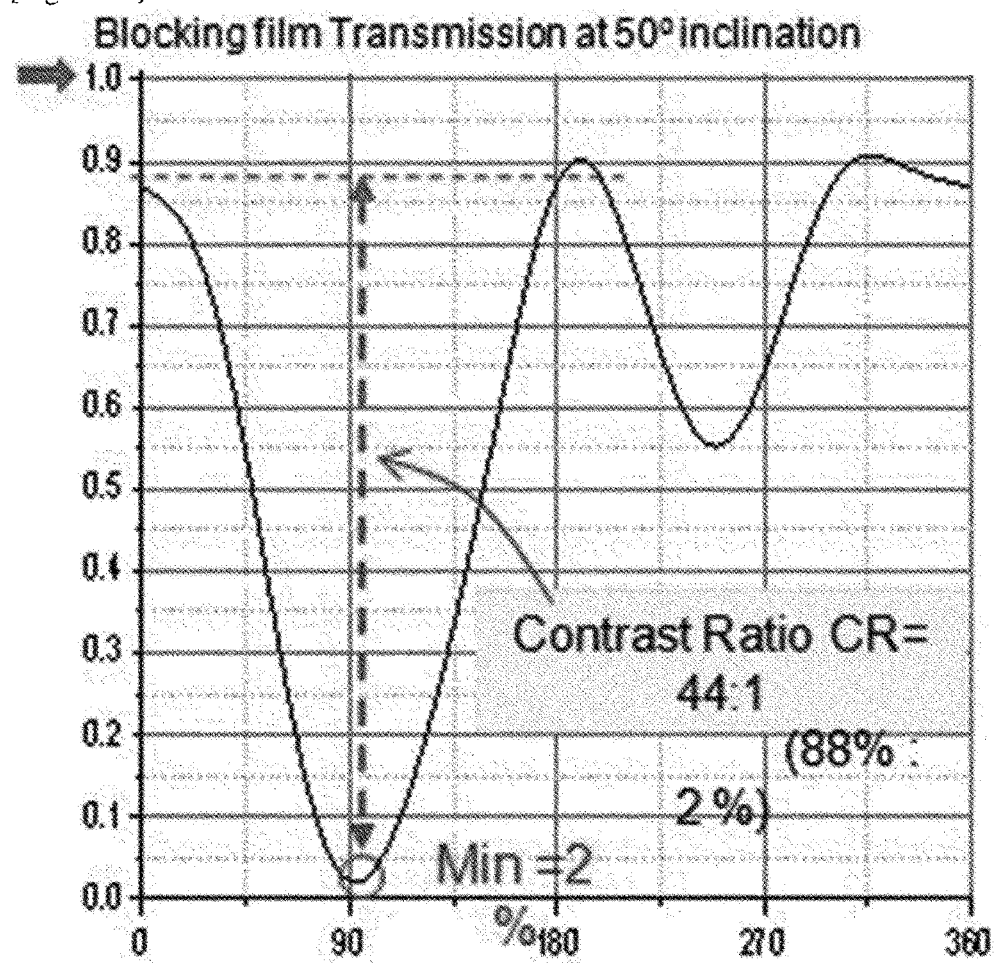

[Figure 24]
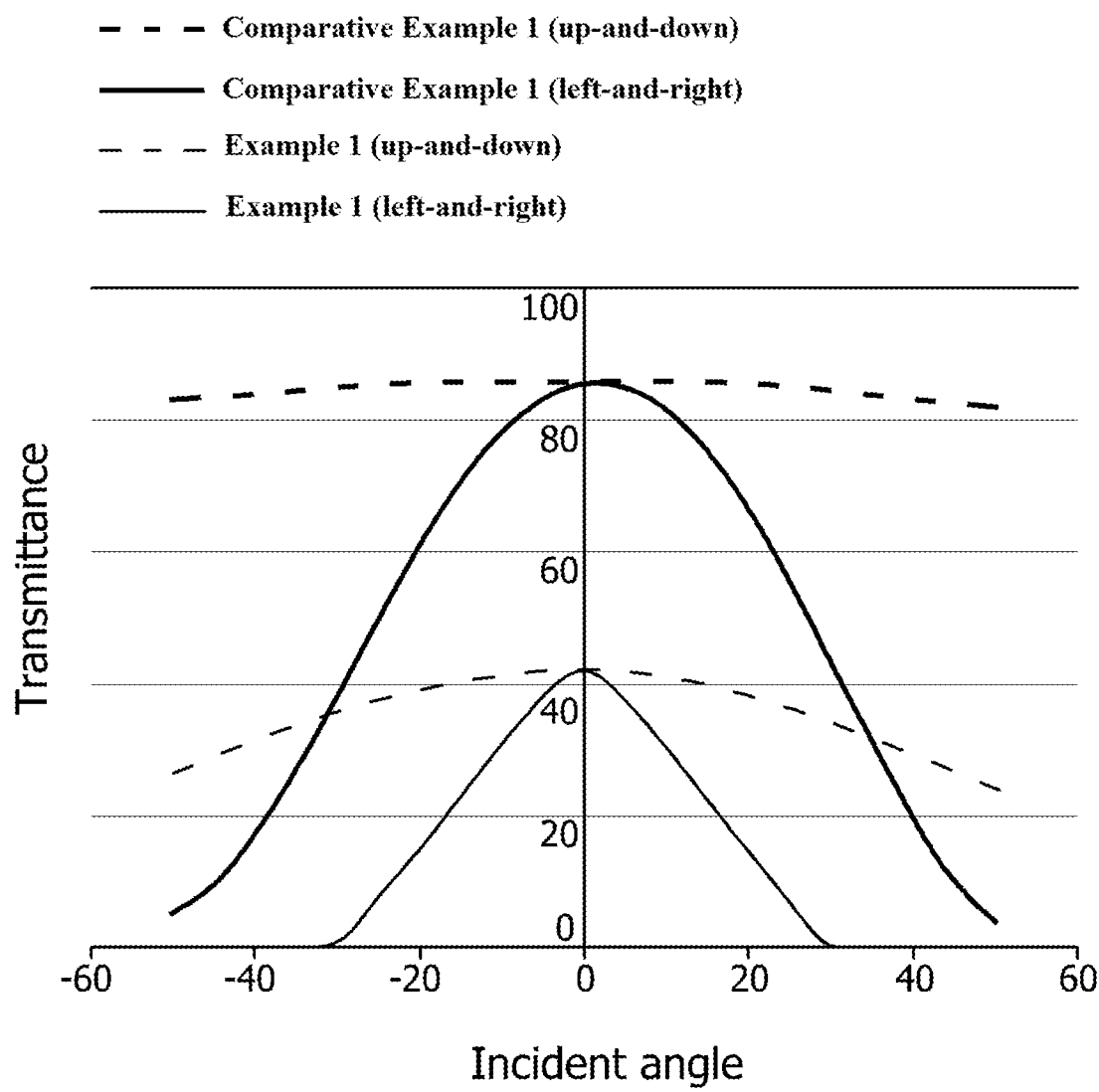

[Figure 25]
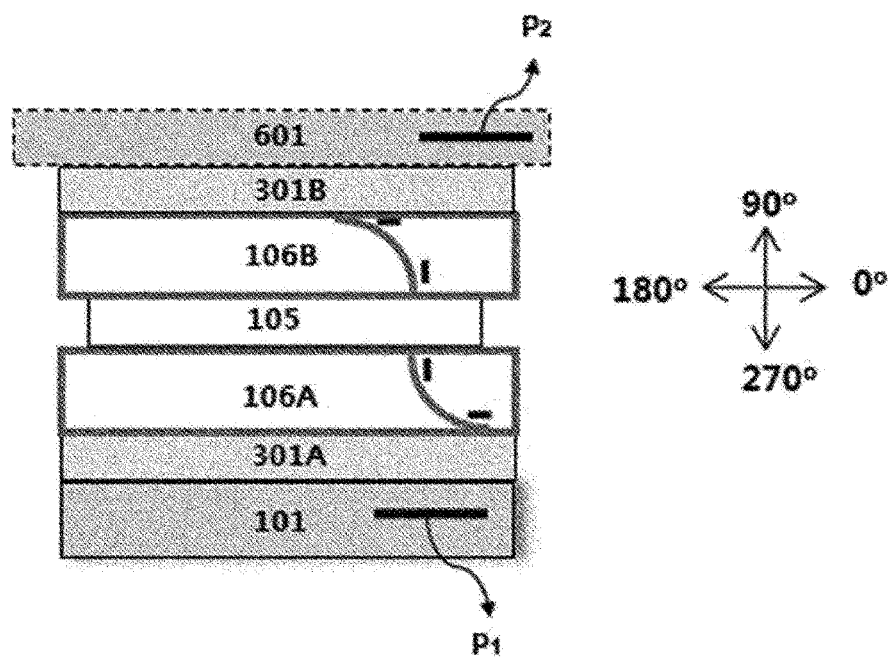

OPTICAL FILM

CROSS-REFERENCE TO RELATED APPLICATIONS

This application is a national phase entry under 35 U.S.C. § 371 of International Application No. PCT/KR2016/011139, filed Oct. 5, 2016, which claims the benefit of priority to Korean Patent Application No. 10-2015-0139698, filed Oct. 5, 2015 and Korean Patent Application No. 10-2015-0139699, filed Oct. 5, 2015, the disclosures of which are incorporated herein by reference.

TECHNICAL FIELD

The present application relates to an optical film and a use of the optical film.

BACKGROUND ART

Usage of security films is increasing with importance of information protection or personal privacies. For example, Patent Document 1 (Korean Patent Laid-Open Publication No. 2007-0090662) discloses a security film applying the micro louver technology. A micro louver film has a structure in which a number of micro-louvers are patterned at regular intervals. A number of micro-louvers formed inside the louver film exert an effect (direction control effect) of controlling the traveling direction of light penetrating the louver film to a predetermined exit angle range. Therefore, it is possible to prevent unnecessary exit of light penetrating the liquid crystal panel to the lateral direction, and such a louver film is also referred to as a light control film. However, in the micro louver film, an aspect ratio is a major factor of the security film performance, where the larger the line width is, the lower the height may be, but there is a problem that if the line width increases, the transmittance decreases.

DISCLOSURE

Technical Problem

The present application provides an optical film and a use of the optical film.

Technical Solution

The present application relates to an optical film. An exemplary optical film comprises a first linear polarizer, a first liquid crystal film, and a second liquid crystal film. The first liquid crystal film and the second liquid crystal film may be sequentially formed on the first linear polarizer. The first liquid crystal film and the second liquid crystal film may be each a spray orientation liquid crystal film. FIG. 1 exemplarily shows an optical film including a first linear polarizer (101), a first spray orientation liquid crystal film (102) and a second spray orientation liquid crystal film (103) in sequence.

In this specification, the term "polarizer" means a functional layer that exhibits selective transmission and blocking properties, e.g., reflection or absorption properties, for incident light. For example, the polarizer may have a function that transmits light vibrating in any one direction from incident light vibrating in various directions and blocks light vibrating in the other directions. The term "linear polarizer" herein means a case in which the selectively transmitted light is a linearly polarized light vibrating in any one direction and the selectively blocked light is a linearly polarized light vibrating in a direction perpendicular to the vibrating direction of the linearly polarized light. Although the type of linear polarizer is not particularly limited, for example, as a reflective polarizer, for example, a DBEF (Dual Brightness Enhancement Film), a lyotropic liquid crystal (LLC) layer or a wire grid polarizer may be used, and as an absorptive polarizer, for example, a polarizer in which iodine is dyed to a polymeric stretched film such as a PVA stretched film or a guest-host polarizer having a liquid crystal polymerized in an oriented state as a host and having an anisotropic dye aligned with the orientation of the liquid crystal as a guest may be used, but is not limited thereto. The linear polarizer may have a light transmission axis and a light absorption axis which are orthogonal to each other in the plane direction.

The term "spray orientation" herein means an oriented state in which a tilt angle of the optical axis of the liquid crystal film changes gradually along the thickness direction of the liquid crystal film. The term "tilt angle" herein means the minimum angle formed by the optical axis of the liquid crystal film and the surface of the liquid crystal film. The term "average tilt angle" herein means an average value of tilt angles of all the optical axes of the liquid crystal film or the tilt angle when an array of all optical axes is converted into an average value. The term "optical axis" herein may mean a slow axis of a liquid crystal film. For example, when the liquid crystal compound included in the liquid crystal film is a rod shape, the optical axis of the liquid crystal film refers to an axis in the long axis direction of the rod shape, and when the liquid crystal compound included in the liquid crystal film is a discotic shape, it refers to an axis in the normal direction of the discotic plane. In this specification, the phrase "a liquid crystal film includes a spray-oriented liquid crystal compound" means that when the liquid crystal compound is a rod shape, the long axis direction in the rod shape gradually changes along the thickness direction of the liquid crystal film, or means that when the liquid crystal compound is a discotic shape, the axis in the normal direction of the discotic plane gradually changes along the thickness direction of the liquid crystal film.

In one example, the spray orientation may mean an oriented state such that the optical axis of the liquid crystal film has a minimum tilt angle in a range of about 0 to about 20 degrees and a maximum tilt angle in a range of about 70 to about 90 degrees, where the tilt angle gradually changes along the thickness direction of the liquid crystal film.

The spray orientation can be divided into a linear spray orientation and a non-linear spray orientation.

In this specification, the term "linear spray orientation" means an oriented state in which the graph depicted by defining the thickness of the liquid crystal film as x-axis and the local tilt angle corresponding to the relevant thickness as y-axis represents a linear graph, that is, an oriented state in which the slope thereof is a constant. In one example, the linear spray orientation may mean an oriented state in which the graph depicted by defining the ratio (z/d) of the relevant thickness (z) to the total thickness (d) of the liquid crystal film as x-axis (that is, x=0 to 1.0) and the local tilt angle corresponding to the relevant thickness as y-axis, provided that the interval (b) of the minimum tilt angle and the maximum tilt angle in the y-axis is the same as the interval (a) in the range of x=0 to 1.0, has a constant slope along x-axis, for example, is an oriented state in which an average slope (tilt factor) is in the range of about 0.95 to 1.05 (see graph A in FIG. 2).

In this specification, the term "non-linear spray orientation" means an oriented state in which the graph depicted by defining the thickness of the liquid crystal film as x-axis and the local tilt angle corresponding to the relevant thickness as y-axis represents a non-linear graph, that is, an oriented state in which the slope thereof varies depending on the thickness of the liquid crystal film. In one example, the non-linear spray orientation may mean an oriented state in which the slope of the tilt angle relative to the thickness of the liquid crystal film gradually increases or gradually decreases. In one example, the non-linear spray orientation may mean an oriented state in which the slope of the graph depicted by defining the ratio (z/d) of the relevant thickness (z) to the total thickness (d) of the liquid crystal film as x-axis (that is, x=0 to 1.0) and the local tilt angle corresponding to the relevant thickness as y-axis, provided that the interval (b) of the minimum tilt angle and the maximum tilt angle in the y-axis is the same as the interval (a) in the range of x=0 to 1.0, gradually decreases along x-axis, but an average slope (tilt factor) is less than about 0.05 (see graph B in FIG. 2), or gradually increases, but an average slope (tilt factor) is more than about 1.05 (see graph C in FIG. 2).

In one specific example, the non-linear spray orientation may be an oriented state in which the slope of the graph gradually decreases along the x-axis in terms of effectively realizing the selective transmission and blocking characteristics depending on viewing angles, as described below, provided that the average slope (tilt factor) is less than about 0.95, for example, about 0.9 or less, about 0.8 or less, about 0.7 or less. In this case, the lower limit of the average slope may be about 0.1 or more, 0.2 or more, 0.3 or more, 0.4 or more, 0.5 or more, or 0.6 or more.

In this specification, unless otherwise noted for the tilt factor, it may mean a tilt factor value derived by measuring phase differences of the film according to angles using Axoscan (Axometrix, Inc.). The tilt factor of the spray orientation liquid crystal film can be adjusted by adjusting the process temperature on preparing the spray orientation liquid crystal film. In one example, a spray orientation liquid crystal film can be prepared by curing a layer of a known spray orientable liquid crystal composition. Here, the curing may be performed by irradiating the layer of the spray orientable liquid crystal composition with ultraviolet, and the tilt factor of the spray orientation liquid crystal film may be adjusted by adjusting the temperature at the time of ultraviolet irradiation. For example, the higher the temperature at the time of ultraviolet irradiation, the more the tilt factor tends to rise.

In one example, the first and second spray orientation liquid crystal films may be each a linear spray orientation liquid crystal film. Such an optical film is advantageous in showing a selective transmittance depending on viewing angles. The first and second spray orientation liquid crystal films may be each a liquid crystal layer containing a linearly spray-oriented liquid crystal compound. The linear spray orientation liquid crystal film may be a single layer liquid crystal film. In this specification, a single layer means a case where a liquid crystal film is formed of one liquid crystal layer, and a liquid crystal film having a structure in which two or more liquid crystal layers are laminated is excluded from a single layer liquid crystal film. The method of forming the linear spray orientation liquid crystal film is not particularly limited and may be formed, for example, by irradiating a layer of a linear spray orientable liquid crystal composition known in the art with ultraviolet and curing it while maintaining a proper temperature.

In one example, the first and second spray orientation liquid crystal films may be each a non-linear spray orientation liquid crystal film. Such an optical film is advantageous in showing selective transmittance depending on viewing angles.

According to one embodiment of the present application, the non-linear spray orientation liquid crystal film may be a liquid crystal layer including a non-linearly spray-oriented liquid crystal compound. The non-linear spray orientation liquid crystal film may be a single layer liquid crystal film. Such a non-linear spray orientation liquid crystal film can be formed by irradiating a layer of a non-linear spray orientable liquid crystal composition known in the art with ultraviolet and curing it while maintaining an appropriate temperature.

According to another embodiment of the present application, the non-linear spray orientation liquid crystal film may comprise a liquid crystal layer including a linearly spray-oriented liquid crystal compound, and a retardation film that satisfies Formula 1 below and a retardation value defined by Equation A below is positive. Such a retardation film can be referred to as a so-called +C plate (positive C plate). When the non-linear spray orientation liquid crystal film is embodied with a linear spray orientation liquid crystal film and a +C plate, it may be advantageous in terms of realizing a non-linearly spray-oriented state having the average tilt angle compared with the case where the non-linear spray orientation liquid crystal film is embodied with a liquid crystal layer containing the non-linearly spray-oriented liquid crystal compound.

$$n_x \approx n_y \neq n_z \qquad \text{[Formula 1]}$$

$$R\text{th} = d \times (n_z - n_y) \qquad \text{[Equation A]}$$

In Formula 1 or Equation A, d is a thickness of a retardation film, $n_x$ is a refractive index of a slow axis direction in a plane of the retardation film, $n_y$ is a refractive index of the direction orthogonal to the slow axis in the plane of the retardation film, and $n_z$ is a refractive index of the direction perpendicular to the thickness direction of the retardation film, that is, both the slow axis and the direction orthogonal thereto.

The +C plate may include a liquid crystal compound existing in a vertically aligned state. The term "vertical alignment" may mean that the optical axis of the liquid crystal compound has a tilt angle of about 90 degrees to about 65 degrees, about 90 degrees to about 75 degrees, about 90 degrees to about 80 degrees, about 90 degrees to about 85 degrees, or about 90 degrees relative to the plane of the retardation film.

The first and second non-linear spray orientation liquid crystal films may be each a liquid crystal layer comprising a non-linearly spray-oriented liquid crystal compound, or each comprise a linear spray orientation liquid crystal film and a +C plate, or any one of the liquid crystal films may be a liquid crystal layer comprising a non-linearly spray-oriented liquid crystal compound and the other may comprise a linear spray orientation liquid crystal film and a +C plate.

In a more specific example for embodying the non-linear spray orientation liquid crystal film, the first and second non-linear spray orientation liquid crystal films may each include a pair of a linear spray orientation liquid crystal film and a +C plate. That is, the first non-linear spray orientation liquid crystal film may include a first linear spray orientation liquid crystal film and a +C plate, and the second non-linear spray orientation liquid crystal film may include a second linear spray orientation liquid crystal film and a +C plate.

In another more specific example of embodying the non-linear spray orientation liquid crystal film, by disposing one +C plate between the first linear spray orientation liquid crystal film and the second linear spray orientation liquid crystal film, it is also possible to represent an effect of the first non-linear spray orientation liquid crystal film composed of the first linear spray orientation liquid crystal film and one half of the +C plate, and the second non-linear spray orientation liquid crystal film composed of the second linear spray orientation liquid crystal film and one half of the +C plate.

In embodying the non-linear spray orientation liquid crystal film as above, the first spray orientation liquid crystal film adjacent to the first linear polarizer may be disposed so that the linear spray orientation liquid crystal film included in the first spray orientation liquid crystal film is closer to the first linear polarizer than the +C plate.

The average tilt angle of the first and/or second spray orientation liquid crystal films may be within a range of, for example, 45 to 55 degrees. In this case, when the first and/or second spray orientation liquid crystal films each realize a linear or non-linear spray orientation at the front, they may function as a linear twisted nematic film at an inclined angle, and thus it is advantageous to selective transmission characteristics depending on viewing angles. Therefore, when the average tilt angle of the first and/or second spray orientation liquid crystal films is within the above range, it is advantageous to exhibit selective transmission characteristics depending on viewing angles.

The thickness of the first and/or second spray orientation liquid crystal films may be appropriately adjusted in consideration of refractive index anisotropy of spray orientation liquid crystals, a retardation value of the liquid crystal film, and an aspect to form a uniform coating. For example, the first and second spray orientation liquid crystal films may be each formed to have a thickness in a range of about 0.1 μm to about 5 μm, about 0.5 μm to about 5 μm, about 1 μm to about 5 μm, about 1.5 μm to about 4.5 μm, about 2 μm to about 4 μm, about 2.5 μm to about 3.5 μm, or about 2.75 μm to about 3.25 μm.

In showing the selective transmission characteristics at an inclined angle, the thickness of the first and/or second spray orientation liquid crystal films is associated with a cut-off angle, that is, an azimuth angle that the transmittance is first minimized, and transmittance at the cut-off angle and the subsequent angles. In one example, as the thickness of the first and/or second spray orientation liquid crystal films increases, the cut-off angle tends to decrease and the transmittance tends to decrease at the cut-off angle. Therefore, considering the blocking performance of the optical film, it may be advantageous to design the thickness of the liquid crystal film to be larger. However, as the thickness of the first and/or second spray orientation liquid crystal films increases, the transmittance tends to increase relatively rapidly at an angle after the cut-off angle. Considering the tendency of selective transmission characteristics depending on the thickness of the liquid crystal film, it may be appropriate to set the thickness ranges of the first and second spray orientation liquid crystal films, respectively, within the above range. The thickness of the first and/or second spray orientation liquid crystal films may be adjusted to a thickness other than the above range in appropriate consideration of the cut-off angle and the transmittance at the cut-off angle and the subsequent angles, required in the selective transmission characteristics.

The liquid crystal compound contained in the first and/or second spray orientation liquid crystal films may be a polymerizable liquid crystal compound. The first and/or second spray orientation liquid crystal films may comprise, for example, a polymerizable liquid crystal compound in a polymerized form. The term "polymerizable liquid crystal compound" herein may mean a compound comprising a moiety capable of exhibiting liquid crystallinity, for example, a mesogen skeleton, and further comprising at least one polymerizable functional group. In addition, the phrase "the polymerizable liquid crystal compound is contained in a polymerized form" may mean a state in which the liquid crystal compound is polymerized to form a skeleton such as a main chain or a side chain of the liquid crystal polymer in the liquid crystal film. As the polymerizable liquid crystal compound, a rod-shaped polymerizable liquid crystal compound or a disc-shaped polymerizable liquid crystal compound can be appropriately selected and used.

The optical film may exhibit, for example, a selective transmittance depending on viewing angles. In one example, the optical film can exhibit a low transmittance when observed at a predetermined azimuth angle and inclined angle, and can exhibit a high transmittance when observed at an inclined angle in an azimuth angle other than the predetermined azimuth angle. In this specification, the terms "inclined angle and azimuth angle" can be described with reference to FIG. 3. In FIG. 3, if the plane (xy plane) by the x-axis and the y-axis is the surface of the optical film, the inclined angle means an angle ($\theta$ in FIG. 3) formed by the normal of the xy plane, that is, the x-axis in FIG. 3, and the viewing direction (P), and the azimuth angle means an angle ($\varphi$ In FIG. 3) formed by the x-axis and the projection on the xy plane of the viewing direction (P). Unless otherwise specified herein, oblique light may refer to light incident at an inclined angle within a range of about 30 degrees to about 50 degrees.

The optical film can design the selective transmittance depending on viewing angles, for example, by adjusting the optical axis of the first and second spray orientation liquid crystal films and the absorption axis of the first linear polarizer. Hereinafter, the term "vertical, orthogonal, horizontal or parallel" herein means substantially vertical, orthogonal, horizontal or parallel to the extent that the desired effect is not impaired. Therefore, each of the above terms may include, for example, an error within ±15 degrees, within ±10 degrees, within ±5 degrees, or within ±3 degrees.

In one example, the projections of the average optical axes of the first and/or second spray orientation liquid crystal films onto the planes of the first and/or second spray orientation liquid crystal films may be parallel to the absorption axis of the first linear polarizer. The term "average optical axis" herein may mean the sum of the vectors of the optical axes present in the liquid crystal film.

In one specific example, the projections of the average optical axes of the first and second spray orientation liquid crystal films onto the planes of the first and second spray orientation liquid crystal films may be parallel to the absorption axis of the first linear polarizer, respectively. Such an optical film can exhibit a relatively low transmittance, for example, when observed at an inclined angle in the azimuth angle of 85 to 95 degrees and at an inclined angle in the azimuth angle of 265 to 275 degrees. Such an optical film can also exhibit a relatively high transmittance when observed at an azimuth angle other than the above azimuth angle, for example an inclined angle in the azimuth angle of 355 to 5 degrees and an inclined angle in the azimuth angle of 175 to 185 degrees.

In one example, for light incident to an inclined angle of 50 degrees in an azimuth angles of 85 to 95 degrees and light incident to an inclined angle of 50 degrees in an azimuth angles of 265 to 275 degrees, the optical film may exhibit transmittance of about 30% or less, respectively. In addition, for light incident to an inclined angle of 50 degrees in an azimuth angle of 355 to 5 degrees and light incident to an inclined angle of 50 degrees in an azimuth angles of 175 to 185 degrees, the optical film may exhibit transmittance of about 80% or more, respectively.

In this specification, while describing the transmittance for the inclined angle, unless otherwise specified, it may mean transmittance at an inclined angle of about 50 degrees. In this specification, while describing the transmittance for the azimuth angle, unless otherwise specified, it may mean transmittance for the azimuth angle in the case of viewing the absorption axis of the first linear polarizer at an azimuth angle of about 0 degrees and about 180 degrees.

In another example, the projections of the average optical axes of the first and/or second spray orientation liquid crystal films onto the planes of the first and second spray orientation liquid crystal films may be each disposed to form an angle of about 10 degrees or more with the absorption axis of the first linear polarizer. The angle may be, more specifically, about 10 degrees or more, about 12.5 degrees or more, about 15 degrees or more, about 17.5 degrees or more, or about 20 degrees or more, without being limited thereto, and may be appropriately selected considering the selective transmission characteristics of the desired viewing angle. Such an optical film can exhibit a relatively low transmittance when observed at an inclined angle in the azimuth angle of 85 to 95 degrees and at an inclined angle in the azimuth angle of 265 to 275 degrees, and can exhibit a relatively high transmittance when observed at an azimuth angle other than the above azimuth angle, for example an inclined angle in the azimuth angle of 355 to 5 degrees and an inclined angle in the azimuth angle of 175 to 185 degrees.

In one example, the optical film can exhibit transmittance of about 10% or less for light incident to an inclined angle of 50 degrees in an azimuth angles of 85 to 95 degrees and can exhibit transmittance of about 60% or less for light incident to an inclined angle of 50 degrees in an azimuth angles of 265 to 275 degrees. In addition, for light incident to an inclined angle of 50 degrees in an azimuth angle of 355 to 5 degrees and light incident to an inclined angle of 50 degrees in an azimuth angle of 175 to 185 degrees, the optical film can exhibit transmittance of about 80% or more, respectively.

In another example, the projections of the average optical axes of the first and/or second spray orientation liquid crystal films onto the first and/or second spray orientation liquid crystal film planes may be disposed to be parallel to the absorption axis of the first linear polarizer. In one specific example, the projections of the average optical axes of the first and second spray orientation liquid crystal films onto the first and second spray orientation liquid crystal film planes may be disposed to be parallel to the absorption axis of the first linear polarizer. Such an optical film can exhibit a relatively low transmittance when observed at an inclined angle in the azimuth angle of 355 to 5 degrees and at an inclined angle in the azimuth angle of 1755 to 185 degrees, and can exhibit a relatively high transmittance when observed at an azimuth angle other than the above azimuth angle, for example an inclined angle in the azimuth angle of 85 to 95 degrees and an inclined angle in the azimuth angle of 265 to 275 degrees.

In one example, for light incident to an inclined angle of 50 degrees in an azimuth angles of 355 to 5 degrees and light incident to an inclined angle of 50 degrees in an azimuth angles of 175 to 185 degrees, the optical film may exhibit transmittance of about 30% or less, respectively. In addition, for light incident to an inclined angle of 50 degrees in an azimuth angle of 85 to 95 degrees and light incident to an inclined angle of 50 degrees in an azimuth angles of 265 to 275 degrees, the optical film may exhibit transmittance of about 80% or more, respectively.

In the present application, the design of the optical axis of the first and second spray orientation liquid crystal films and the absorption axis of the first linear polarizer is not limited to the above, but can be appropriately changed in consideration of the selective transmittance depending on the desired viewing angle.

The rotation direction of spray orientation of the first and/or second spray orientation liquid crystal films can be appropriately selected within a range that does not impair the purpose of the present application. The term "rotation direction of spray orientation" herein may mean the direction in which the tilt angle increases. For example, when the direction in which the tilt angle increases is clockwise, it can be referred to as a right rotation spray orientation, and when the direction in which the tilt angle increases is counterclockwise, it can be referred to as a left rotation spray orientation. In one example, the rotation directions of spray orientation of the first and second spray orientation liquid crystal films may be equal to each other. For example, the first and second spray orientation liquid crystal films may have a right spray-oriented state, respectively, or have a left spray-oriented state, respectively. In another example, the first and second spray orientation liquid crystal films may have rotation directions of spray orientation different from each other. For example, the first spray orientation liquid crystal film may have a right spray orientation and the second spray orientation liquid crystal film may have a left spray orientation, or the first spray orientation liquid crystal film may have a left spray orientation and the second spray orientation liquid crystal film may have a right spray orientation.

The tilt angle at the interface between the first and second spray orientation liquid crystal films can be appropriately adjusted within a range that does not impair the purpose of the present application. In this specification, the "tilt angle at the interface between the first and second spray orientation liquid crystal films" may mean an angle formed by the tilt angle of the region, in the first spray orientation liquid crystal film, closest to the second spray orientation liquid crystal film and the tilt angle of the region, in the second spray orientation liquid crystal film, closest to the first spray orientation liquid crystal film. In one example, the tilt angle at the interface between the first and second spray orientation liquid crystal films may be about 0 to 20 degrees, about 0 to 18 degrees, about 0 to 16 degrees, about 0 to 14 degrees, about 0 to about 12 degrees or about 0 to about 10 degrees. In another example, the tilt angle at the interface between the first and second spray orientation liquid crystal films may be about 70 to 90 degrees, about 72 to 90 degrees, about 74 to 90 degrees, about 76 to 90 degrees, about 78 to about 90 degrees or about 80 to about 90 degrees.

FIGS. 4 and 5 are illustrative drawings for explaining the rotation directions of spray orientation and the tilt angle at the interface, of the first and/or second spray orientation liquid crystal films. In one example, as shown in FIG. 4, the optical film comprises a first spray orientation liquid crystal film (102) and a second spray orientation liquid crystal film (103) each having a right spray orientation, wherein the tilt angle at the interface between the first and second spray orientation liquid crystal films may be about 0 degrees (the sign − is an optical axis). In another example, as shown in FIG. 5, the optical film comprises a first spray orientation liquid crystal film (102) having a left spray orientation and a second spray orientation liquid crystal film (103) having a right spray orientation, wherein the tilt angle at the interface between the first and second spray orientation liquid crystal films may be about 80 degrees to 90 degrees (the sign − is an optical axis).

When the spray orientation liquid crystal film is a linear spray orientation liquid crystal film, the retardation value of the first and/or second spray orientation liquid crystal films may be appropriately selected within a range that does not impair the purpose of the present application. For example, the first and/or second spray orientation liquid crystal films may have an in-plane retardation value (Rin) defined by Equation B below within a range of about 150 nm to about 650 nm. When the first and/or second spray liquid crystal films have the above retardation value, it is advantageous that the optical film exhibits a selective transmittance with respect to the viewing angle, but the retardation value is not necessarily limited to the above range.

$$Rin = d \times (nx - ny) \quad \text{[Equation B]}$$

In Equation B, d is a thickness of a liquid crystal film, nx is a refractive index of a slow axis direction in the plane of the liquid crystal film, and ny is a refractive index of the direction perpendicular to the slow axis of the liquid crystal film. The term "refractive index" herein can be a refractive index for light with a wavelength of 550 nm, unless otherwise specified.

The optical film may further comprise a third spray orientation liquid crystal film. The third spray orientation liquid crystal film may be a linear spray orientation liquid crystal film or a non-linear spray orientation liquid crystal film. For the details of the spray orientation in the third spray orientation liquid crystal film, the contents described in the item of the first and second spray orientation liquid crystal films can be equally applied. In one example, the third spray orientation liquid crystal film may exist between the first spray orientation liquid crystal film (102) and the second spray orientation liquid crystal film (103), as shown in FIG. 6. In this case, the first and second spray orientation liquid crystal films may have rotation directions of spray orientation equal to each other, and for example, may have right rotation spray orientation equal to each other. In addition, as shown in FIG. 6, the tilt angle at the interface between the third spray orientation liquid crystal film and the first spray orientation liquid crystal film and/or the tilt angle at the interface between the third spray orientation liquid crystal film and the first spray orientation liquid crystal film may be each about 70 degrees to 90 degrees, about 72 degrees to 90 degrees, about 74 degrees to 90 degrees, about 76 degrees to 90 degrees, about 78 degrees to 90 degrees, or from about 80 degrees to 90 degrees. Such an optical film is advantageous in terms of uniformly exhibiting selective transmission characteristics depending on to the viewing angles for light of a wide wavelength band, for example, light of the entire wavelength band of visible light. That is, since the optical film exhibits uniform transmission characteristics in a wide wavelength band, it can exhibit excellent color characteristics.

In addition to the first and second spray orientation liquid crystal films, the optical film may further comprise a retardation film referred to as the aforementioned +C plate. In one example, the retardation film may exist between the first and second spray orientation liquid crystal films, as shown in FIG. 7. In this case, the first and second spray orientation liquid crystal films may have rotation directions of spray orientation equal to each other, and for example, may have right spray orientation equal to each other. In addition, as shown in FIG. 7, the tilt angle at the interface between the retardation film and the first spray orientation liquid crystal film and/or the tilt angle at the interface between the retardation film and the first spray orientation liquid crystal film may be about 0 to 20 degrees, about 0 to 18 degrees, about 0 to 16 degrees, about 0 to 14 degrees, about 0 to 12 degrees, or about 0 to 10 degrees. Such an optical film is advantageous in terms of uniformly exhibiting selective transmission characteristics depending on the viewing angle for light of a wide wavelength band, for example, light of the entire wavelength band of visible light. That is, since the optical film exhibits uniform transmission characteristics in a wide wavelength band, it can exhibit excellent color characteristics.

Also, the optical film may further comprise a twisted nematic liquid crystal layer or a half-wave phase delay layer. The twisted nematic liquid crystal layer or the half-wave phase delay layer (201) may exist, for example, between the first linear polarizer (101) and the first spray orientation liquid crystal film (102), as shown in FIG. 8.

The term "twisted nematic liquid crystal layer" herein means a layer containing a twisted oriented nematic liquid crystal compound and this layer may be, for example, a liquid crystal polymer layer. The liquid crystal polymer layer may mean, for example, a layer in which a polymerizable liquid crystal compound is polymerized in a twisted oriented state to form a polymer. In this specification, the phrase "the liquid crystal compound is twisted oriented" may mean a spirally oriented structure in which waveguide groups of liquid crystal molecules are layered while being twisted along a screw axis. Although such a structure is similar to a so-called cholesteric alignment type, when the distance of the waveguide groups of liquid crystal molecules up to completing rotation of 360 degrees is referred to as "pitch," the twisted nematic liquid crystal layer can be distinguished from the cholesteric alignment in that it has a thickness of less than the pitch. That is, in the twisted nematic liquid crystal layer, the waveguide groups of liquid crystal molecules may not be rotated 360 degrees. Such a twisted nematic liquid crystal layer may be formed, for example, on a suitable film or sheet.

In this specification, the term "n-wavelength phase delay characteristic" may mean a characteristic capable of delaying the incident light by n times the wavelength of the incident light within at least a part of the wavelength range. Therefore, the half-wave phase delay layer can have a characteristic capable of delaying the incident light by a half of the wavelength of the incident light within at least a part of the wavelength range. The half-wave phase delay layer can develop, for example, in-plane retardation in the range of 200 nm to 290 nm or 220 nm to 280 nm for a wavelength of 550 nm. The half-wave phase delay layer is not particularly limited, as long as it exhibits the above phase delay characteristic, and for example, a liquid crystal film or a polymeric stretched film can be used.

When the optical film further comprises a twisted nematic liquid crystal layer or a half-wave phase delay layer, it is possible to reverse tendencies of the selective transmission characteristics depending on the azimuth angles at the angles formed by the absorption axis of the first polarizer and the projections of the average optical axes of the first and second spray orientation liquid crystal films onto the planes of the liquid crystal films, and the inclined angle. In the following examples, for the specific values for transmittance and the inclined angles, the aforementioned values can be equally applied.

For example, when the optical film includes a twisted nematic liquid crystal layer or a half-wave phase delay layer between the first linear polarizer and the first spray orientation liquid crystal film, and the projections of the average optical axes of the first and second spray orientation liquid crystal films onto the planes of the first and second spray orientation liquid crystal films are each parallel to the absorption axis of the first linear polarizer, the optical film may exhibit a relatively low transmittance for the cases of being observed at an inclined angle in the azimuth angle of 355 to 5 degrees and at an inclined angle in the azimuth angle of 175 to 185 degrees, and may exhibit a relatively high transmittance for the cases of being observed at azimuth angles of other than the above azimuth angles, for example, at an inclined angle in the azimuth angle of 85 to 95 degrees and at an inclined angle in the azimuth angle of 265 to 275 degrees.

In addition, when the optical film includes a twisted nematic liquid crystal layer or a half-wave phase delay layer between the first linear polarizer and the first spray orientation liquid crystal film, and the projections of the average optical axes of the first and second spray orientation liquid crystal films onto the planes of the first and second spray orientation liquid crystal films are each perpendicular to the absorption axis of the first linear polarizer, the optical film may exhibit a relatively low transmittance for the cases of being observed at an inclined angle in the azimuth angle of 85 to 95 degrees and an inclined angle in the azimuth angle of 265 to 275 degrees, and may exhibit a relatively high transmittance for the cases of being observed at azimuth angles other than the above azimuth angles, for example, at an inclined angle in the azimuth angle of 355 to 5 degrees and at an inclined angle in the azimuth angle of 175 to 185 degrees.

In the optical film of the present application, as described above, the optical film may exhibit the selective transmission characteristics depending on azimuth angles at inclined angles according to the angles formed by the projections of the average optical axes of the first and second spray orientation liquid crystal films onto the planes of the first and second spray orientation liquid crystal films with the absorption axis of the first linear polarizer. In particular, when the projections of the average optical axes of the first and second spray orientation liquid crystal films onto the planes of the first and second spray orientation liquid crystal films are perpendicular to the absorption axis of the first linear polarizer, it is advantageous for exhibiting a uniform and sharp elliptical transmittance compared to the case of being parallel thereto. Therefore, in designing for the optical film to exhibit a relatively low transmittance for the cases of being observed at an inclined angle in the azimuth angle of 85 to 95 degrees and at an inclined angle in the azimuth angle of 265 to 275 degrees, it may be advantageous in terms of exhibiting decrease of the uniform elliptical transmittance that a twisted nematic liquid crystal layer or a half-wave phase delay layer is disposed between the first spray orientation liquid crystal film and the first linear polarizer of the optical film and the projections of the average optical axes of the first and second spray orientation liquid crystal films onto the planes of the first and second spray orientation liquid crystal films are perpendicular to the absorption axis of the first linear polarizer, without being necessarily limited thereto.

The optical film may further comprise a pressure-sensitive adhesive layer. As shown in FIG. 9, the first spray orientation liquid crystal film (102) and the second spray orientation liquid crystal film (103) may exist in a state of being adhered by the pressure-sensitive adhesive layer (301). The pressure-sensitive adhesive layer may be suitably selected from known pressure-sensitive adhesive layers within a range that does not impair the purpose of the present application and used. For example, a cured product of a composition containing a curable compound may be used as the pressure-sensitive adhesive layer and a heat curable or ultraviolet curable compound may be used as the curable compound, without being limited thereto. The type of the pressure-sensitive adhesive layer can also be appropriately selected within a range that does not impair the purpose of the present application. For example, a solid phase adhesive, a semisolid phase adhesive, an elastic adhesive, or a liquid crystal adhesive can be appropriately selected and used. The solid phase adhesive, the semisolid phase adhesive or the elastic adhesive may be referred to as a so-called pressure-sensitive adhesive (PSA) and may be cured before bonding adhesion objects together. A liquid phase adhesive can be referred to as a so-called optical clear resin (OCR) and may be cured after bonding adhesion objects together. According to one embodiment of the present application, the PSA may be used as the pressure-sensitive adhesive, but is not limited thereto.

The optical film may further comprise a base material layer. The base material layer may exist adjacent to the first and/or second spray orientation liquid crystal films. In one example, as shown in FIG. 10, the base material layer (401A) may exist adjacent to the opposite side of the first spray orientation liquid crystal film (102) on which the second spray orientation liquid crystal film (103) is formed, that is, may exist between the spray orientation liquid crystal film (102) and the first linear polarizer (101), or the base material layer (401B) may exist adjacent to the opposite side of the second spray orientation liquid crystal film (103) on which the first spray orientation liquid crystal film (102) is formed.

As the base material layer, a known material can be used without particular limitation. For example, an inorganic film such as a glass film, a crystalline or amorphous silicon film, quartz or ITO (indium tin oxide) film, or a plastic film can be used. As the base material layer, an optically isotropic base material layer or an optically anisotropic base material layer such as a phase delay layer can also be used.

As the plastic base material layer, a base material layer comprising TAC (triacetyl cellulose); COP (cyclo olefin copolymer) such as COC (cyclo olefin polymer) and norbornene derivatives; PMMA (poly(methyl methacrylate)); PC (polycarbonate); PE (polyethylene); PP (polypropylene); PVA (polyvinyl alcohol); DAC (diacetyl cellulose); Pac (Polyacrylate); PES (poly ether sulfone); PEEK (polyetheretherketon); PPS (polyphenylsulfone), PEI (polyetherimide); PEN (polyethylenemaphthatlate); PET (polyethyleneterephtalate); PI (polyimide); PSF (polysulfone); PAR (polyarylate) or an amorphous fluorine resin, and the like may be used, but is not limited thereto. In the base material layer, a coating layer of gold, silver, a silicon compound such as silicon dioxide or silicon monoxide, or a coating layer such as an antireflection layer may be also present.

In one example, a base material layer having a small in-plane retardation value can be used as the base material layer. As the above base material layer, for example, Normal TAC, in an unstretched state, having an in-plane retardation value of about 10 nm or less, NRT (no retardation TAC) or ORT (O-retardation TAC) having an in-plane retardation value of about 10 nm or less and also a thickness direction retardation value of about 5 nm, or COP or COC substantially free of an in-plane retardation value, may be used, but is not limited thereto, and the type of the aforementioned base material layers may be appropriately selected depending on the use of the optical film and used.

The optical film may further comprise one or more alignment films. The alignment film can adjust the projections of the average optical axes of the first and/or second spray orientation liquid crystal films onto the liquid crystal films. The alignment film may exist adjacent to the first and/or second spray orientation liquid crystal films. In one example, the alignment film may exist adjacent to the opposite side of the first spray orientation liquid crystal film on which the second spray orientation liquid crystal film is formed, or may exist adjacent to the opposite side of the second spray orientation liquid crystal film on which the first spray orientation liquid crystal film is formed. In addition, when the optical film comprises two sheets of base material layers as in FIG. 11, the alignment films (501A, 501B) may be disposed between the base material layer (401A) and the first spray orientation liquid crystal film (102) and between the base material layer (401B) and the second spray orientation liquid crystal film (103), respectively. As the alignment film, for example, a contact type alignment film such as a rubbing alignment film or an alignment film, including a photo-alignment film compound, known to be capable of exhibiting alignment characteristics by a non-contact method such as irradiation of a linearly polarized light, can be used, without limitation.

The optical film may further comprise a second linear polarizer. For example, as shown in FIG. 12, the second linear polarizer (601) may exist adjacent to the first spray orientation liquid crystal film opposite side of the second spray orientation liquid crystal film (103). For the details of the definition and type of the second linear polarizer, the contents described in the item of the first linear polarizer may be equally applied. In one example, the optical film may be disposed such that the absorption axis of the second linear polarizer is parallel to the absorption axis of the first linear polarizer. For example, when the optical film is observed at an inclined angle and a predetermined azimuth angle, the first and second spray orientation liquid crystal films may perform a role to rotate the vibrating direction of the polarized light penetrating any one linear polarizer of the first and second linear polarizers to about 80 degrees to 90 degrees, where the polarized light having the rotated vibrating direction does not penetrate the other linear polarizer, so that the transmittance can be controlled when being observed at an inclined angle and a predetermined azimuth angle.

The present application also relates to a use of the optical film. The optical film may exhibit selective transmission and blocking characteristics depending on the azimuth angles at a predetermined inclined angle. Such an optical film can be usefully used as a security film or an anti-reflection film of a display device. The optical film may be disposed on the side of an observer in the display device.

In one example, the observer can observe images of the display device relatively well when observing the display device at an azimuth angle showing the transmission characteristic and the observer cannot observe images of the display device relatively well when observing the display device at an azimuth angle showing the blocking characteristic, so that the optical film can function as a security film of the display device.

In another example, when the display device is used in an external environment having a reflection function, a phenomenon in which an image of the display device is reflected by the external environment having the reflection function can be reduced, so that it can be used as an anti-reflection film. The window of the vehicle can be exemplified as the external environment having the reflection function. For example, when the display device is arranged for an observer to be able of observing the display device at an azimuth angle showing transmission characteristics and for the external environment having a reflection function to be positioned at an azimuth angle showing blocking characteristics, the observer can observe the image of the display device and the phenomenon that the image of the display device is reflected by the reflective external environment and projected can be reduced. For example, when the external environment having the reflection function is the window of the vehicle and the display device is arranged to be observable from the side of the driver's seat of the vehicle, the phenomenon that the image of the display device is reflected on the front window of the vehicle and projected to the observer, can be reduced.

In one example, the display device may be a liquid crystal display device. The liquid crystal display device may comprise a light source, a lower polarization plate, a liquid crystal panel, an upper polarization plate, and an optical film of the present application in sequence.

As the light source, for example, a direct type or an edge type backlight unit (BLU) commonly used in the LCD (liquid crystal display) can be used. Various kinds of light sources other than the above may be used without limitation.

The liquid crystal panel may comprise, for example, a first substrate, a pixel electrode, a first alignment film, a liquid crystal layer, a second alignment film, a common electrode, and a second substrate, sequentially formed from the side of the light source. For example, an active driving circuit including a TFT (Thin Film Transistor) as a driving element electrically connected to the transparent pixel electrode and wiring may be formed on the first substrate from the side of the light source. The pixel electrode includes, for example, ITO (Indium Tin Oxide) or the like, and can function as an electrode for each pixel. In addition, the first or second alignment film may include a material such as polyimide.

The liquid crystal layer may include an appropriate type of liquid crystal depending on a mode of a liquid crystal display device to be driven. For example, the optical film of the present invention can be applied to the IPS (In Plane Switching) and TN (Twisted Nematic) mode liquid crystal display devices to adjust transmission characteristics depending on viewing angles, but the mode of the liquid crystal display device is not necessarily limited thereto, and can be applied to liquid crystal display devices of various modes.

In one example, when the optical film of the present invention is applied to an IPS mode liquid crystal display device, it is advantageous for exhibiting selective transmission and blocking characteristics depending on viewing angles. In another example, in the case where the optical film of the present invention is applied to a TN mode liquid crystal display device, when a separate optical film is additionally disposed as required, it can be more advantageous for exhibiting selective transmission and blocking characteristics depending on viewing angles. As the separate optical film, a half-wave phase delay layer or a twisted nematic liquid crystal layer or the like can be exemplified. When the half-wave phase delay layer is used as the separate optical film, the optical axis of the half-wave phase delay layer and the absorption axis of the first linear polarizer may form an angle of about 20 to 25 degrees, specifically about 22 to about 23 degrees, more specifically about 22.5 degrees. The liquid crystal layer may have a function to transmit or block light from the light source for each pixel by a voltage applied from the driving circuit. The common electrode includes, for example, ITO or the like, and can serve as a common counter electrode.

In addition, the liquid crystal display may further comprise upper and lower polarization plates present in upper and lower parts of the liquid crystal panel. For example, the lower polarization plate may be disposed closer to the side of the light source than the upper polarization plate. In one example, the upper polarization plate may play a role corresponding to the second linear polarizer described in the item of the optical film. For example, the optical film may be disposed to be present in a state that the second spray orientation liquid crystal film and the upper polarization plate of the liquid crystal panel are adhered to each other.

In one example, the optical film may be arranged so that the absorption axis of the first linear polarizer and the absorption axis of the upper polarization plate of the liquid crystal panel are parallel. FIG. 13 exemplarily shows a liquid crystal display device comprising a first linear polarizer (101), a first spray orientation liquid crystal film (102), a second spray orientation liquid crystal film (103) and an upper polarization plate (701) in order. In such an liquid crystal display device, for example, when the liquid crystal display device is observed at an inclined angle and a predetermined azimuth angle in a state that the first linear polarizer is close to the observer, the first and second spray orientation liquid crystal films may perform a role to rotate the vibrating direction of the polarized light penetrating the upper polarization plate of the liquid crystal panel from the light source to about 80 degrees to 90 degrees, where the polarized light having the rotated vibrating direction does not penetrate the first linear polarizer of the optical film, so that the transmittance can be reduced.

Here, as long as the liquid crystal display device comprises the optical film of the present application, the other components, structures, and the like are not particularly limited, and all contents well known in the art can be appropriately applied.

The optical film of the present application can also be usefully used in smart windows or sunglasses. The term "smart window" herein refers to a window having a function capable of controlling transmittance of incident light, for example, sunlight, which is a concept encompassing a functional device referred to as a so-called smart blind, electronic curtain, transmittance variable glass or light control glass. The term "sunglass" herein may refer to a functional device for protecting the eye from sunlight. As shown in FIG. 14, for example, the smart window or the sunglass comprising the optical film of the present application may have a characteristic that the transmittance particularly for light incident at an inclined angle and a predetermined azimuth angle can be decreased and the transmittance for light incident at an inclined angle and an azimuth angle other than the above predetermined azimuth angle can be increased. Therefore, the optical film of the present application can be usefully used in a smart window or a sunglass which is intended to exhibit a selective transmittance depending on viewing angles. Here, as long as the smart window or the sunglass comprises the optical film of the present application, the other components, structures, and the like are not particularly limited, and all contents well known in the art can be appropriately applied.

Advantageous Effects

The present application can provide an optical film exhibiting selective transmission and blocking characteristics depending on viewing angles. Such an optical film can be usefully used for a security film of a display device such as an LCD, a smart window, and a sunglass.

BRIEF DESCRIPTION OF DRAWINGS

FIG. 1 is a schematic diagram of an optical film of the present application.
FIG. 2 is a schematic diagram for explaining spray orientation.
FIG. 3 is a schematic diagram for explaining an inclined angle and an azimuth angle.
FIGS. 4 to 7 are schematic diagrams of spray orientation of the first and second spray orientation liquid crystal films.
FIGS. 8 to 12 are schematic diagrams of optical films of the present application.
FIG. 13 is a schematic diagram of a liquid crystal display device of the present application.
FIG. 14 is a schematic diagram for explaining selective transmission and blocking characteristics depending on viewing angles in a smart window or sunglass of the present application.
FIG. 15 is a structure of the optical film of Example A1.
FIG. 16 is a structure of the optical film of Example A4.
FIGS. 17 to 24 show results evaluating transmittance.
FIG. 25 is a structure of the optical film of Example B 1.

MODE FOR INVENTION

Hereinafter, the present invention will be described in more detail with reference to Examples and Comparative Examples. However, the scope of the present application is not limited by the contents set forth below.

<Linear Spray Orientation Liquid Crystal Film>

Example A1

An optical film of Example A1 having the structure of FIG. 15 was prepared. Specifically, after a photo-alignment film was formed on an NRT base material film (Fuji Co.) (301A, 301B), a spray orientation liquid crystal composition, which was prepared by dissolving a mixed solid content of 95% by weight of a spray orientable polymerizable liquid crystal compound (manufactured by Merck Co.) consisting of cyanobiphenyl-based acrylate, cyanophenyl-cyclohexane-based acrylate and cyanophenyl ester-based acrylate, and 5% by weigh of IGACURE 907 (manufactured by Ciba-Geigy Co., Switzerland)) as a photo initiator, in a solvent of toluene to be 25% by weight of the total solution, was coated on the photo-alignment film via bar coating to be a thickness of about 2 μm after drying, and then the coating layer was left to stand in an oven at about 80° C. for 2 minutes and dried.

Subsequently, the dried coating layer was irradiated with ultraviolet (300 mW/cm$^2$) for about 10 seconds while maintaining the temperature at about 80° C. to form a liquid crystal layer, thereby preparing a first linear spray orientation liquid crystal film (102). Next, a second linear spray orientation liquid crystal film (103) was prepared in the same method as the method of preparing the first linear spray orientation liquid crystal film. The lowest tilt angle of the base material surfaces of the first and second linear spray orientation liquid crystal films is about 16 degrees, the uppermost tilt angle of the air surfaces is about 73 degrees, the average tilt angle is about 45 degrees, and the tilt factor is in the range of about 0.95 to 1.05.

Subsequently, the first and second linear spray orientation liquid crystal films produced by the above-described method were bonded to each other through a pressure sensitive adhesive (301) such that the air surfaces face each other and the tilt angles at the interface are equal to each other. Next, a first absorptive linear polarizer (101) was disposed on the opposite side of the base material film (301A) on which the liquid crystal film (102) was formed, and a second absorptive linear polarizer (601) functioning as an upper polarization plate of an LCD was disposed on the opposite side of the base material film (301B) on which the liquid crystal film (103) was formed. The optical film of Example 1 is disposed such that the projections of the average optical axes of the first and second liquid crystal films (102, 103) onto the planes of the liquid crystal films are each parallel to the absorption axis ($P_1$) of the first linear polarizer and the absorption axis ($P_2$) of the second linear polarizer is also parallel to the absorption axis ($P_1$) of the first linear polarizer.

Example A2

An optical film was prepared in the same manner as Example A1, except that the first and second linear spray orientation liquid crystal films were formed to have a thickness of 3.5 μm, respectively. The lowest tilt angle of the base material surfaces of the first and second linear spray orientation liquid crystal films in Example A2 is about 3 degrees, the uppermost tilt angle of the air surfaces is about 85 degrees, the average tilt angle is about 50 degrees, and the tilt factor is in the range of about 0.95 to 1.05.

Example A3

An optical film was prepared in the same manner as Example A1, except that the first and second linear spray orientation liquid crystal films were formed to have a thickness of 4.5 μm, respectively. The lowest tilt angle of the base material surfaces of the first and second linear spray orientation liquid crystal films in Example A3 is about 2 degrees, the uppermost tilt angle of the air surfaces is about 86 degrees, the average tilt angle is about 51 degrees, and the tilt factor is in the range of about 0.95 to 1.05.

Example A4

An optical film of Example A4 having the continuous (cascade) structure of FIG. 16 was prepared. Specifically, in the optical film of Example A2, structures other than the second linear polarizer (601) were further laminated on the side of the first linear polarizer (101) in the optical film of Example A2 to obtain the optical film of Example A4.

Example A5

An optical film was prepared in the same manner as Example A1, except that the projections of the average optical axes of the first and second linear spray orientation liquid crystal films onto the planes of the first and second linear alignment liquid crystal films were disposed to form about 5 degrees with the absorption axis of the first polarizer.

Example A6

An optical film was prepared in the same manner as Example A1, except that the projections of the average optical axes of the first and second linear spray orientation liquid crystal films onto the planes of the first and second linear alignment liquid crystal films were disposed to form about 10 degrees with the absorption axis of the first polarizer.

Example A7

An optical film was prepared in the same manner as Example A1, except that the projections of the average optical axes of the first and second linear spray orientation liquid crystal films onto the planes of the first and second linear alignment liquid crystal films were disposed to form about 15 degrees with the absorption axis of the first polarizer.

Comparative Example A1

Comparative Example A1 was prepared, except for using an automotive louver film from 3M Co. (LCF: Light Control Film) (having a structure in which a DBEF and a louver film are laminated) instead of the laminate of the first and second linear spray orientation liquid crystal films in Example A1.

Evaluation Example A1 Evaluation of Transmittance

For the optical film prepared in Example A1, the transmittances depending on an azimuth angles of 0 to 360 degrees were evaluated using Axoscan (Axometrix, Inc.) at inclined angles of 30 degrees, 40 degrees and 50 degrees, respectively, and the results were shown in FIG. 17 and Table 1.

TABLE 1

| | | Transmittance depending on azimuth angles (%) | | | |
|---|---|---|---|---|---|
| | | 0 degrees (360 degrees) | 90 degrees | 180 degrees | 270 degrees |
| Inclined angle | 30 degrees | 91.68 | 60.99 | 83.2 | 24.8 |
| | 40 degrees | 91.91 | 42.39 | 80.7 | 5.8 |
| | 50 degrees | 91.72 | 23.47 | 90.58 | 27.68 |

For the optical films prepared in Examples A1 to A3, the transmittances depending on the azimuth angles of 0 to 360 degrees were evaluated using Axoscan (Axometrix, Inc.) at an inclined angle of about 50 degrees, and the results were shown in FIG. 18 and Table 2. In addition, for the optical films prepared in Examples A1 to A3, the transmittances depending on up-and-down (azimuth angle 80 degrees and 270 degrees) and left-and-right (azimuth angle 0 degrees (360 degrees) and 180 degrees) inclined angles were evaluated, and the results were shown in FIGS. 19 to 21.

TABLE 2

| | Transmittance depending on azimuth angles (%) | | | |
|---|---|---|---|---|
| | 0 degrees (360 degrees) | 90 degrees | 180 degrees | 270 degrees |
| Example A1 (thickness 2 μm) | 91.72 | 23.47 | 90.58 | 27.68 |
| Example A2 (thickness 3.5 μm) | 95.32 | 4.62 | 94.01 | 7.63 |
| Example A3 (thickness 4.5 μm) | 94.33 | 14.49 | 91.87 | 25.12 |

For the optical films prepared in Examples A2 and A4, the transmittances depending on the azimuth angles of 0 to 360 degrees were evaluated using Axoscan (Axometrix, Inc.) at an inclined angle of about 50 degrees, and the results were shown in Table 3.

TABLE 3

| | | Transmittance depending on azimuth angles (%) | | | |
|---|---|---|---|---|---|
| | | Example 2 | | Example 4 | |
| | | 0 degrees (360 degrees) | 90 degrees | 0 degrees (360 degrees) | 90 degrees |
| Inclined angle | 30 degrees | 94.67 | 44.25 | 82.22 | 17.5 |
| | 40 degrees | 93.53 | 20.48 | 82.92 | 4.16 |
| | 50 degrees | 95.32 | 4.62 | 83.37 | 1.48 |

For the optical films prepared in Examples A1 and A5 through A7, the transmittances depending on the azimuth angles of 0 to 360 degrees were simulated and evaluated using Axoscan (Axometrix, Inc.) at an inclined angle of about 50 degrees, and the results were shown in FIG. 22 (depicting Examples A1 and A5 to A7), FIG. 23 (depicting Example A7), and Table 4.

TABLE 4

| | Transmittance depending on azimuth angles (%) | | | | |
|---|---|---|---|---|---|
| | 0 degrees (360 degrees) | 90 degrees | 180 degrees | 270 degrees | Contrast ratio |
| Example A1 (=0°) | 92 | 17.8 | 90 | 17.8 | 5.1:1 |
| Example A5 (=5°) | 90 | 9 | 90 | 29 | 10:1 |
| Example A6 (=10°) | 87 | 3.7 | 90 | 42 | 24:1 |
| Example A7 (=15°) | 86 | 2 | 90 | 55 | 44:1 |

For the optical film of Example A1 and the micro louver film of Comparative Example A1, the transmittances depending on up-and-down (azimuth angle 80 degrees and 270 degrees) and left-and-right (azimuth angle 0 degrees (360 degrees) and 180 degrees) inclined angles were evaluated using Axoscan (Axometrix, Inc.), and the results were shown in FIG. 23. As shown in FIG. 24, it can be confirmed that in the optical film of Example A1 the effect of increasing the front transmittance as a whole is greater compared to the micro louver film of Comparative Example A1.

<Non-Linear Spray Orientation Liquid Crystal Film>

Example B1

An optical film of Example B1 having the structure shown in FIG. 25 was prepared. Specifically, after a photo-alignment film was formed on an NRT base material film (Fuji Co.) (301A, 301B), a spray orientation liquid crystal composition, which was prepared by dissolving a mixed solid content of 95% by weight of a spray orientable polymerizable liquid crystal compound (manufactured by Merck Co.) consisting of cyanobiphenyl-based acrylate, cyanophenyl-cyclohexane-based acrylate and cyanophenyl ester-based acrylate, and 5% by weigh of IGACURE 907 (manufactured by Ciba-Geigy Co., Switzerland)) as a photo initiator, in a solvent of toluene to be 25% by weight of the total solution, was coated on the photo-alignment film via bar coating, and then the coating layer was left to stand in an oven at about 80° C. for 2 minutes and dried.

Subsequently, the dried coating layer was irradiated with ultraviolet (300 mW/cm$^2$) for about 10 seconds while maintaining the temperature at about 80° C. to form a first linear spray orientation liquid crystal film (106A) having a thickness of about 3.5 μm. Next, a second linear spray orientation liquid crystal film (106B) was prepared in the same method as the method of preparing the first linear spray orientation liquid crystal film. They were linear spray orientation liquid crystal films in which the lowest tilt angle of the base material surface of the first and second linear spray orientation liquid crystal films is about 0 degrees, the uppermost tilt angle of the air surface is about 90 degrees, and the tilt factor is about 1.0.

Subsequently, a +C plate (105) having a thickness of about 3.3 μm, an Rin value of about 10 nm or less and an Rth value of about 400 nm was attached between the surfaces of the first and second linear spray orientation liquid crystal films, thereby preparing a laminate of a non-linear spray orientation liquid crystal film such as one in which two non-linear spray orientation liquid crystal films having a tilt factor of less than about 0.95 were laminated. Here, the first and second linear spray orientation liquid crystal films were attached so that the tilt angles in their air surfaces are equal to each other.

Subsequently, a first absorptive linear polarizer (101) was disposed on the opposite side of the base material film (301A) on which the liquid crystal film (106A) was formed, and a second absorptive linear polarizer (601) functioning as an upper polarization plate of an LCD was disposed on the opposite side of the base material film (301B) on which the liquid crystal film (106B) was formed. The optical film of Example 1 is disposed such that the projections of the average optical axes of the first and second liquid crystal films (106A, 106B) onto the planes of the liquid crystal films are each parallel to the absorption axis ($P_1$) of the first linear polarizer and the absorption axis ($P_2$) of the second linear polarizer is also parallel to the absorption axis ($P_1$) of the first linear polarizer.

Example B2

The first and second spray orientation liquid crystal films were prepared in the same manner as Example 1, except that in the step of preparing the first and second spray orientation liquid crystal films the temperature of the coating layer of the spray orientation liquid crystal composition was maintained at 40° C. The tilt factors of the prepared first and second spray orientation liquid crystal films were about 0.7, respectively.

Subsequently, the first and second linear spray orientation liquid crystal films were attached so that the tilt angles in the air surfaces are equal to each other.

Next, the first and second absorptive linear polarizers were disposed in the same manner as Example B1 to prepare the optical film of Example B2.

Comparative Example B1

Comparative Example B1 was prepared, except for using an automotive louver film from 3M Co. (LCF: Light Control Film) (having a structure in which a DBEF and a louver film are laminated) instead of the laminate of the non-linear spray orientation liquid crystal film in Example B1.

Evaluation Example B1 Evaluation of Front Brightness and Transmittance at Up- and Down Inclined Angles For Example B1 and Comparative Example B1-B2, the transmittances depending on up-and-down (azimuth angle 90 degrees and 270 degrees) inclined angles of 30 degrees and 50 degrees were evaluated using Axoscan (Axometrix Co.), and the results were shown in Table 5 below.

TABLE 5

|  | Example B1 | Comparative Example B1 |
| --- | --- | --- |
| Front brightness | 91% | 83% |
| Up and down 30 degrees inclined angle | 23% | 20% |
| Up and down 50 degrees inclined angle | 10% | 10% |

DESCRIPTION OF REFERENCE NUMERALS

101: first linear polarizer
102: first spray orientation liquid crystal film
103: second spray orientation liquid crystal film
104: third spray orientation liquid crystal film
105: retardation film
106A and 106B: first and second linear spray orientation liquid crystal films
201: twisted nematic liquid crystal layer or half-wave phase delay layer
301: pressure-sensitive adhesive layer
401A, 401B: base material layer
501A, 501B: alignment film
601: second polarizer
701: upper polarization plate

The invention claimed is:

1. An optical film comprising:
a first linear polarizer;
first and second spray orientation liquid crystal films sequentially formed on the first linear polarizer; and
a second linear polarizer adjacent to the second spray orientation liquid crystal film,
wherein absorption axes of the second linear polarizer and the first linear polarizer are parallel to each other; and
wherein projections of the average optical axes of the first and second spray orientation liquid crystal films onto planes of the first and second spray orientation liquid crystal films are each parallel to the absorption axis of the first linear polarizer.

2. The optical film according to claim 1, wherein the first and second spray orientation liquid crystal films are each a liquid crystal layer comprising a linearly spray-oriented liquid crystal compound.

3. The optical film according to claim 1, wherein the first and second spray orientation liquid crystal films are each a liquid crystal layer comprising a non-linearly spray-oriented liquid crystal compound.

4. The optical film according to claim 1, wherein the first and second spray orientation liquid crystal films each comprise a liquid crystal layer comprising a linearly spray-oriented liquid crystal compound, and a positive C plate.

5. The optical film according to claim 1, exhibiting transmittance of 30% or less for light incident to an inclined angle of 50 degrees in an azimuth angles of 85 to 95 degrees and light incident to an inclined angle of 50 degrees in an azimuth angles of 265 to 275 degrees provided that azimuth angles of 0 degrees and 180 degrees are an angle of the absorption axis in the first linear polarizer.

6. The optical film according to claim 1, wherein the first and second spray orientation liquid crystal films have rotation directions of spray orientation equal to each other.

7. The optical film according to claim 1, wherein tilt angles at the interface between the first spray orientation liquid crystal film and the second spray orientation liquid crystal film form 0 degrees to 10 degrees to each other.

8. The optical film according to claim 1, wherein the first and second spray orientation liquid crystal films have rotation directions of spray orientation different from each other.

9. The optical film according to claim 1, wherein tilt angles at the interface between the first and second spray orientation liquid crystal films form 80 degrees to 90 degrees to each other.

10. The optical film according to claim 1, further comprising a third spray orientation liquid crystal film disposed between the first and second spray orientation liquid crystal films.

11. The optical film according to claim 1, further comprising a twisted nematic liquid crystal layer or a half-wave phase delay layer existing between the first linear polarizer and the first spray orientation liquid crystal film.

12. The optical film according to claim 1, further comprising a base material layer existing between the first linear polarizer and the first spray orientation liquid crystal film or adjacent to the second spray orientation liquid crystal film.

13. A liquid crystal display device comprising a light source, a lower polarization plate, a liquid crystal panel, an upper polarization plate and the optical film of claim 1 in sequence.

14. The liquid crystal display device according to claim 13, wherein the upper polarization plate and the second spray orientation liquid crystal film of the optical film exist in a state attached to each other, and the absorption axis of the upper polarization plate and the absorption axis of the first linear polarizer of the optical film are parallel to each other.

* * * * *